United States Patent [19]

Takemoto et al.

[11] Patent Number: 5,841,547
[45] Date of Patent: Nov. 24, 1998

[54] DIGITAL IMAGE FORMING APPARATUS PROVIDING PLURAL BOOKBINDING MODES

[75] Inventors: Motomi Takemoto; Eiichi Yoshida, both of Toyokawa, Japan

[73] Assignee: Minolta Co., Ltd., Osaka, Japan

[21] Appl. No.: 739,916

[22] Filed: Oct. 30, 1996

[30] Foreign Application Priority Data

Nov. 1, 1995 [JP] Japan ................................. 7-306396

[51] Int. Cl.$^6$ .......................... H04N 1/00; G03B 27/32; G03G 15/00
[52] U.S. Cl. ...................... 358/296; 358/401; 358/448; 355/25; 399/83; 399/362
[58] Field of Search .................................. 358/296, 401, 358/404, 444, 448–453, 468, 471, 474; 355/23, 25, 77; 395/101, 115, 116; 399/45, 82, 83, 85, 86, 182–194, 362, 408

[56] References Cited

U.S. PATENT DOCUMENTS 5,231,516  7/1993  Kamon et al. ........................ 358/449

FOREIGN PATENT DOCUMENTS 7-50738  2/1995  Japan .

OTHER PUBLICATIONS

U.S. application No. 08/633,445.

U.S. application No. 08/633,452.

Primary Examiner—Peter S. Wong
Assistant Examiner—Gregory J. Toatley, Jr.
Attorney, Agent, or Firm—McDermott, Will & Emery

[57] ABSTRACT

A copier capable of forming printed matter in a mode where the center of spread page is bound, in which a bookbinding mode whereby record paper having a size twice as much as a designated size is folded in two to thereby constitute a cover (first page) and a back cover (final page) and record paper having the designated size on which intermediate pages are recorded, are interposed between the cover and the back cover, is prepared as the bookbinding mode suitable for forming printed matter in the mode where the center of a spread page is bound, an image signal provided by scanning the document is stored in image storing regions of an image memory corresponding to respective pages of the document and the image storing regions are successively designated, such that the image is printed on the record paper in accordance with the order of a page arrangement in compliance with the bookbinding mode.

5 Claims, 25 Drawing Sheets

| MEMORY REGION | PAGE NUMBER | FORWARD CONNECTION | REARWARD CONNECTION | ADDITIONAL DATA |
|---|---|---|---|---|
| 00 | 1 | 01 | 01 | |
| 01 | 1 | 01 | FF | |
| 02 | 2 | 00 | 03 | |
| 03 | 2 | 03 | FF | |
| ⋮ | ⋮ | ⋮ | ⋮ | |

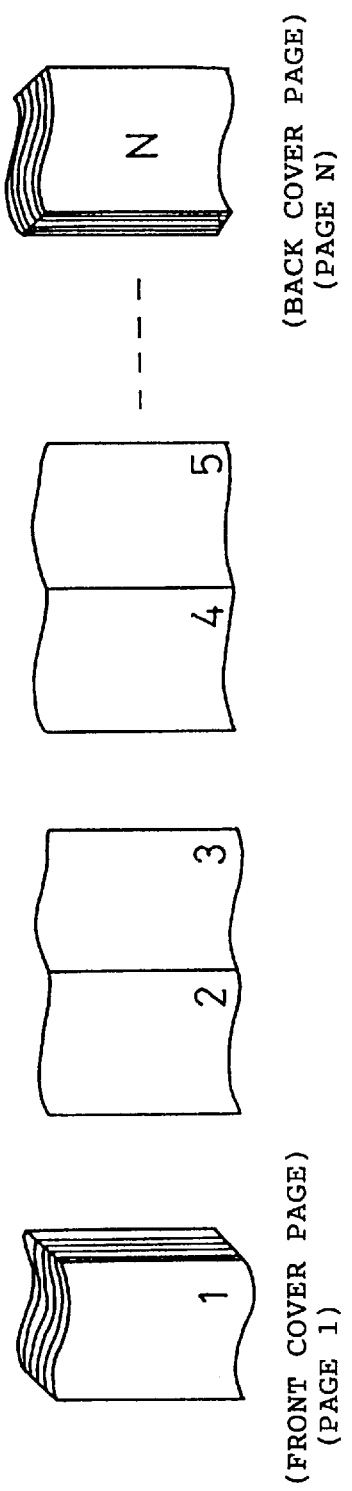

Fig. 8(c)
(PRIOR ART)
$N = 4n - 2 \ (n = 2, 3, 4, \cdots)$
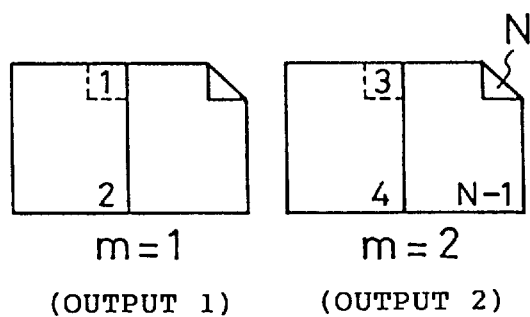
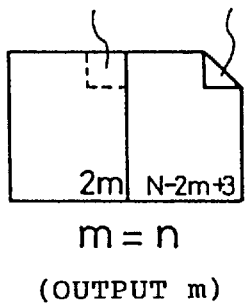
Fig. 8(d)
(PRIOR ART)
$N = 4n - 3 \ (n = 2, 3, 4, \cdots)$
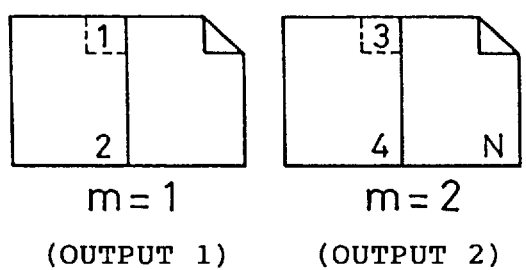
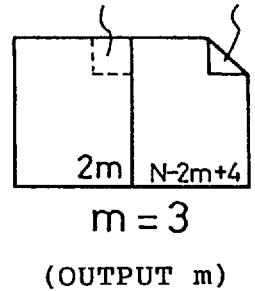

DIGITAL IMAGE FORMING APPARATUS PROVIDING PLURAL BOOKBINDING MODES

BACKGROUND OF THE INVENTION

1. Field of the Invention

The present invention relates to a digital image forming apparatus, particularly to a digital image forming apparatus capable of making a plurality of sheets of copies in the order of page arrangement which is suitable for making printed matter having a mode in which center lines of spread pages are bound.

2. Description of the Prior Art

A both face copier capable of copying both first face (front face) and second face (back face) of record paper where a first document image is copied on first face of record paper fed from a first normal paper feeding device, the record paper on the first face of which the image has been formed is once led to a second paper feeding device such as an intermediate tray etc. and a second document image is copied on an unrecorded second face of the record paper fed from the second paper feeding device, has already and widely been used.

As one use of such a both face copier, there is an application of making printed matter of plural pages having a comparatively small number of copies. In such a case the center binding (hereinafter, referred to as "weekly magazine binding") where centers of spread pages are bound as in a weekly magazine is often conducted in order to bind the provided copy with good appearance. Hence, a copier capable of making record paper in the order of page arrangement suitable for such a weekly magazine binding, has been proposed by the applicant (refer to Japanese Laid-Open Patent Publication No. H7-50738).

However, the application is provided with an inconvenience in which according to the weekly magazine binding a plurality of sheets of record paper each is folded in two at the center line in the longitudinal direction and therefore, when the number of sheets of the record paper to be bound is increased, the more the record paper is disposed at the inner side that is folded in two, the more the record paper is pushed out toward the outer direction in respect of the fold and as a result the more the record paper is disposed at the inner side, the more the record paper is projected from the edge of a sheet of the record paper constituting an exterior cover whereby a copy with good appearance cannot be provided.

SUMMARY OF THE INVENTION

It is a main object of the present invention to provide a digital image forming apparatus suitable for making printed matter having a mode where centers of spread pages are bound and capable of making a copy in the order of novel page arrangement.

It is another object of the present invention to provide a digital image forming apparatus having two book binding modes suitable for making printed matter with a mode where centers of spread pages are bound and capable of making printed matter with good appearance by selecting a book binding mode that is optimized in accordance with the number of sheets of document.

The other objects of the present invention will be clarified through a detailed explanation of the present invention in reference to the drawings.

BRIEF DESCRIPTION OF THE DRAWINGS

FIG. 6 is a diagram showing an example of original documents for weekly magazine binding mode;

FIGS. 8(a), 8(b), 8(c) and 8(d) are diagrams explaining the conventional weekly magazine binding mode;

DETAILED DESCRIPTION OF THE PREFERRED EMBODIMENTS

An explanation will be given of the embodiments of the present invention as follows.

[Outlines of the Construction of a Copier]

Figure 1:
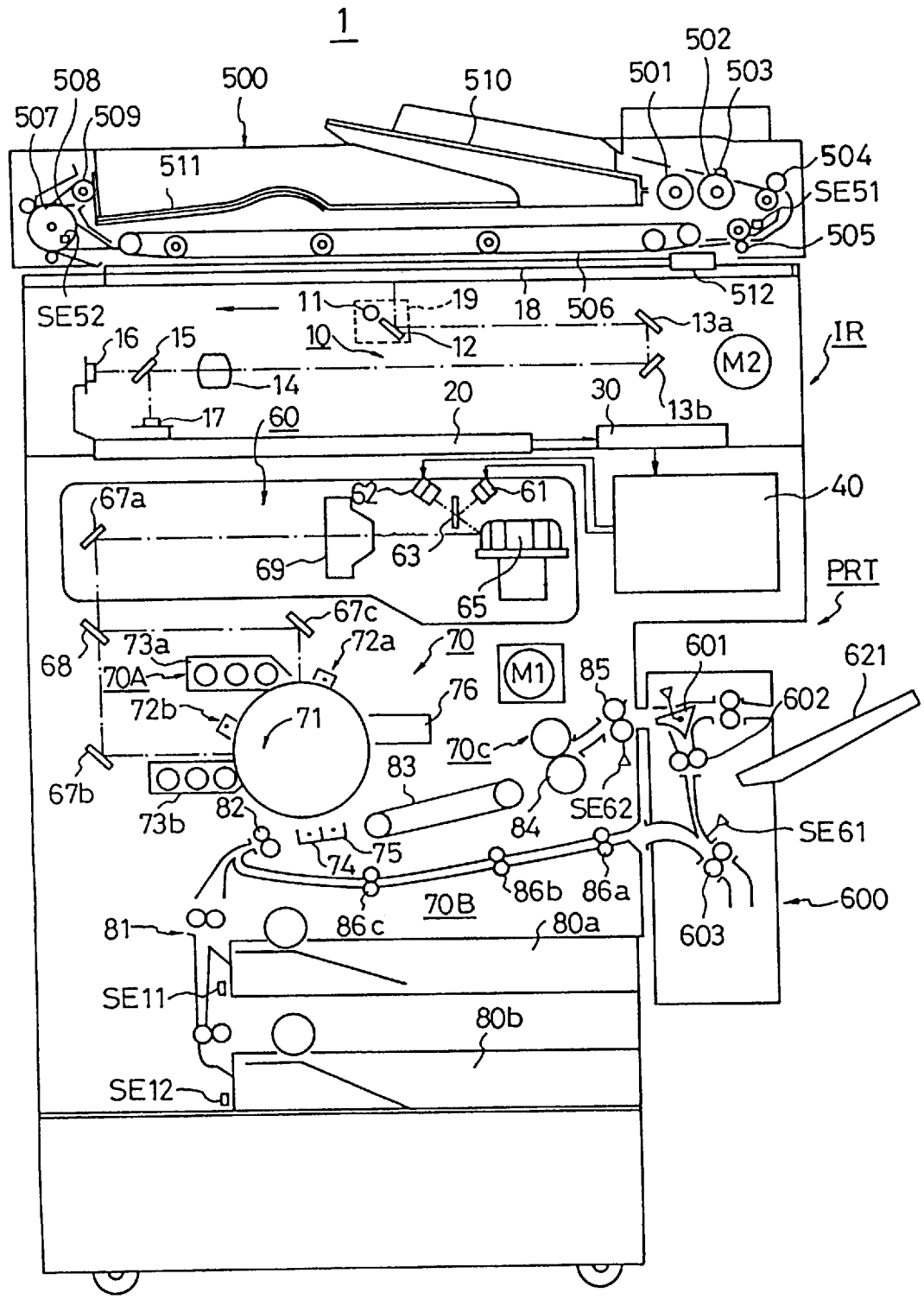
FIG. 1 is a sectional view showing the outline of the construction of a copier to which the present invention is applied.
Figure 2:
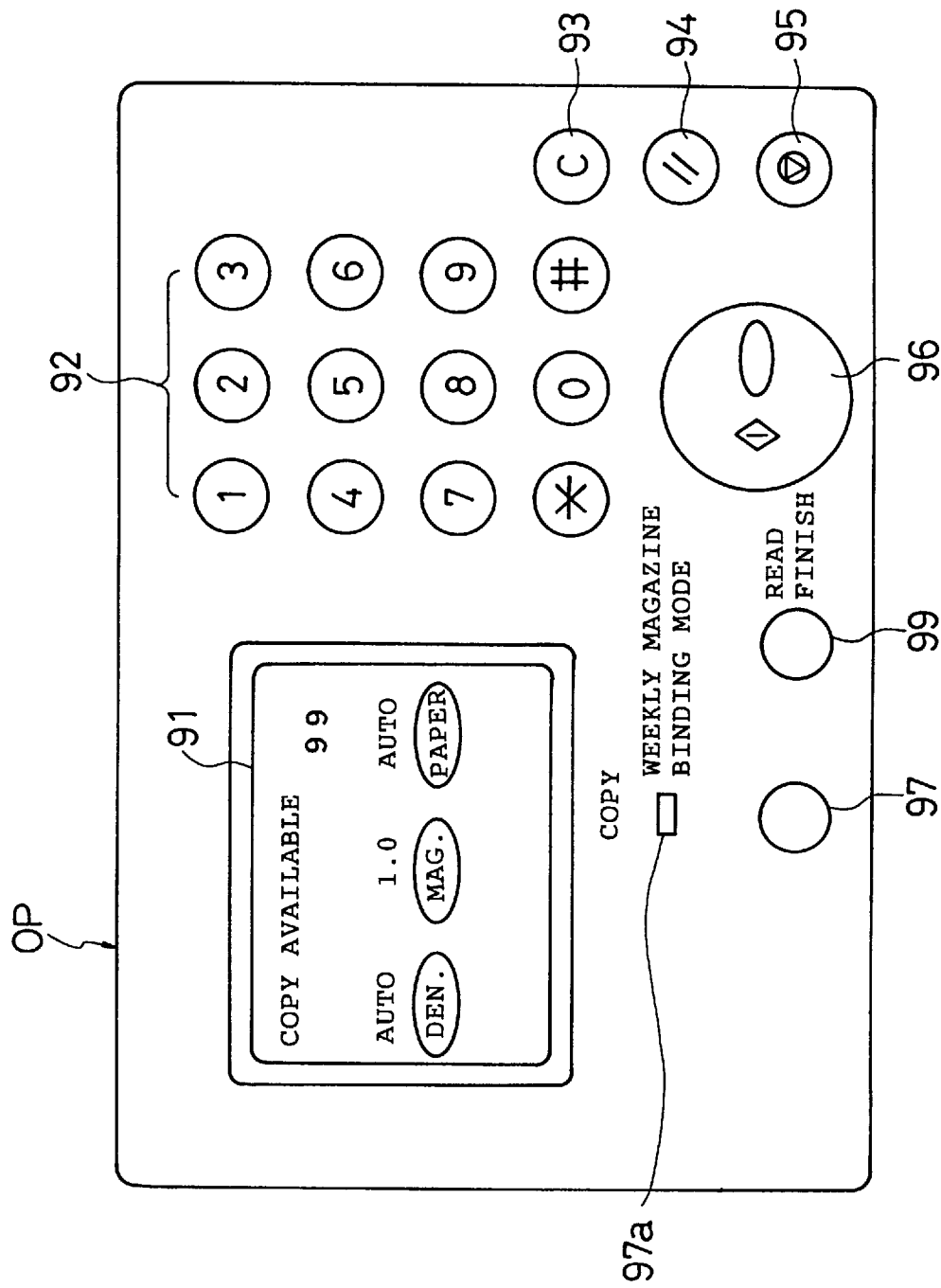
FIG. 2 is a plane view showing the structure of an operation panel.

FIG. 1 is a sectional view showing the outlines of the construction of a copier to which the present invention is applied and FIG. 2 is a front view of an operation panel.

In FIG. 1 and FIG. 2, a copier 1 is constituted by a scanning system 10 reading a document and converting it into image signal, an image signal processing unit 20 processing the image signal sent from the scanning system 10, a memory unit 30 controlling to output the image data inputted from the image signal processing unit 20 as it is to a printer device or controlling to store it to a memory, a printing processing unit 40 driving two semiconductor lasers 61 and 62 based on the image data outputted from the memory unit 30, a laser optical system 60 guiding two laser beams from the semiconductor lasers 61 and 62 to different exposure positions on a photosensitive body drum 71, an image forming system 70 developing latent image produced by exposure, transferring the developed image on record paper and fixing the transferred image on record paper, an operational panel OP provided on the upper face of the main body of the copier, a document feeder unit 500 transferring the original document and reversing the first face and second face thereof as necessary and a paper refeeding unit 600 for refeeding record paper to the reading position.

Incidentally, a reading device IR is constituted by the scanning system 10, the image signal processing unit 20 and the like and a printer device PRT is constituted by the printing processing unit 40, the laser optical system 60, the image forming system 70 and the like, respectively.

The scanning system 10 is constituted by an exposure lamp 11 and a first mirror 12 integrated to a scanner 19 moving below a document platform 18, second and third mirrors 13a and 13b, a focusing lens 14, a dichroic mirror 15, photosensitive conversion elements 16 and 17 using CCD arrays etc., a scan motor M2 and the like.

The dichroic mirror 15 reflects light having a specific color, for example, red color among light reflected from the document and transmits light in the complementary relation with the light having the specific color. The photosensitive conversion elements 16 and 17 individually convert into electric signals the image of the non-specific color that is mainly composed of black color and the image of the specific color (red color) in the document.

The image signal processing unit 20 processes the image signals outputted from the two photosensitive conversion elements 16 and 17, identifies respective pixels of the document image as those having the specific color (second color) and those having color other than the specific color (first color) and outputs the image data having the color data to the memory unit 30. A detailed explanation will later be given of the memory unit 30.

The printing processing unit 40 retards the image data given to the semiconductor laser 62 on one hand in accordance with the difference in the exposure positions corresponding to the two semiconductor lasers 61 and 62 in compliance with the sent image data with the color data.

The laser optical system 60 is constituted by the semiconductor lasers 61 and 62, a dichroic mirror 63 for synthesizing the two laser beams, a polygonal mirror 65 for deflecting the synthesized laser beam, a main lens 69, a reflecting mirror 67a, a dichroic mirror 68 for separating the synthesized laser beam into two laser beams, reflecting mirrors 67b and 67c and the like.

The image forming system 70 is constituted by a developing system 70A, a transfer system 70B and a fixing system 70C.

The developing system 70A is constituted by the photosensitive body drum 71 driven to rotate in the anti-clockwise direction of FIG. 1, a first electrifying charger 72a, a first developer 73a, a second electrifying charger 72b, a second developer 73b, a transferring charger 74, a separating charger 75, a cleaning unit 76 and the like which are arranged at the surrounding of the photosensitive body drum 71 successively from the upstream side in the rotating direction.

The first developer 73a stores a two components developing agent comprising a red toner and a carrier corresponding to the second color and the second developer 73b stores a two components developing agent comprising a black toner and a carrier corresponding to the first color.

The transfer system 70B is constituted by cassettes 80a and 80b storing record paper, size detecting sensors SE11, SE12 detecting the size of record paper, a record paper guide 81, timing rollers 82, a transfer belt 83, horizontal transfer rollers 86a, 86b and 86c transferring record paper transferred from the paper refeeding unit 600.

The fixing system 70C is constituted by fixing rollers 84 transferring record paper on which the toner image has been formed while thermo-compressing it, discharge rollers 85, a discharge sensor SE62 detecting the discharge of record paper which has been subjected to the fixing treatment and the like.

The paper refeeding unit 600 temporarily stores record paper discharged from the discharge rollers 85 and feeds the record paper to the horizontal carrier rollers 86a in the transfer system 70B to form a further image by reversing the first face and second face of the record paper in the case of the both face mode, or without reversing the first face and second face thereof in the case of a synthesizing mode. The paper refeeding unit 600 is constituted by a switch claw 601 switching the discharge of record paper to a discharge tray 621 and the guiding of the record paper to the refeeding transfer path, transfer rollers 602, reverse rollers 603, a reverse sensor SE61 etc.

According to the both face copying mode, in the first copying operation the switch claw 601 is switched to the side of the paper refeeding transfer path by a solenoid, not illustrated, and record paper on one face of which image has been formed reaches the reverse rollers 603 via the transfer rollers 602. When the rear end of the record paper is detected by the reverse sensor SE61, the reverse rollers 603 are reversely rotated and the record paper reaches the timing rollers 82 via the horizontal transfer rollers 86a through 86c and awaits there. At this instance successive sheets of record paper are also transferred at predetermined intervals and the number of sheets of the record paper capable of awaiting at the horizontal transfer rollers 86a through 86c, depends on the length of the record paper when there is no delay in the image data.

The document feeder unit 500 automatically feeds document sheet on a document feeding tray 510 onto the document platform 18 and discharges document read by the scanner 19 to a document discharge unit 511.

In the normal mode a single or a plurality of sheets of document is set in the document feeding tray 510 with faces of sheets thereof to be read disposed upwardly. When the operation is started, the set document is transferred by a feed roller 501 successively from the lowest sheet thereof and is fed one by one by being handled by a handling roller 502 and a handling pad 503. The transferred document passes through intermediate rollers 504 and the oblique progressing thereof is corrected by register rollers 505. Immediately after the rear end of the document passes through the left end of a document scale 512, a transfer belt 506 is reversely rotated slightly and is stopped.

Thereby, the trail end of the document is brought into contact with the end edge of the document scale 512 whereby the document is set to an accurate position on the document platform 18. At this instance the leading end of the next document reaches the registration rollers 505 whereby the transfer time of the next document is shortened.

When the document is set to the accurate reading position on the document platform 18, the reading scan of the document is performed by the scanner 19. When the reading of the document is finished, the document is transferred to the left by the transfer belt 506, the transfer direction is changed by a reverse roller 507, the document passes above a switch claw 508 and is discharged onto the discharged tray 511 with a face of the document for reading disposed upwardly by a discharge roller 509.

Further, in the case of the both face document, when the reading of the first face is finished, the document is transferred to the left by the transfer belt 506, the transfer direction thereof is changed by the reverse roller 507 and thereafter, the document is sent again onto the document platform 18 by the switch claw 508 and the second face of the document is set at the reading position. The document the second face of which has finished reading, is transferred to the left by the transfer belt 506 and is discharged onto the discharge tray 511 via the reverse roller 507, the switch claw 508 and the discharge roller 509.

[Operation Panel]

FIG. 2 is a plane view showing the structure of the operation panel OP. The operation panel OP is provided with a liquid crystal touch panel 91, ten keys 92 inputting set numbers such as a number of sheets of copies etc. and copy magnification etc., a clear key 93 restoring set numbers to the standard value "1", a panel reset key 94 restoring set values set in the copier to standard values, a stop key 95 stopping the copying operation and a starter key 96 starting the copying operation.

The operation panel OP is further provided with a bookbinding mode setting key 97 selectively setting either one of the weekly magazine binding mode and the normal mode (The weekly magazine binding mode is selectively set by the key operation and the normal mode is set when the key operation is not performed.), a read finish key 99 whereby when reading of all the document is finished, the fact of finishing is inputted to the device and a display unit 97a displaying that the selectively set bookbinding mode is the weekly magazine binding mode.

The liquid crystal touch panel 91 can display the operational state of the copier such as the exposure level, the copy magnification, the record paper size etc., various abnormal states of the copier such as occurrence of jamming of paper, occurrence of call for a service man, occurrence of empty paper etc. and other information and the panel can input the designation of automatic selecting modes of darkness, copy magnification and record paper, or the like.

[Controlling Unit]

Figure 3:
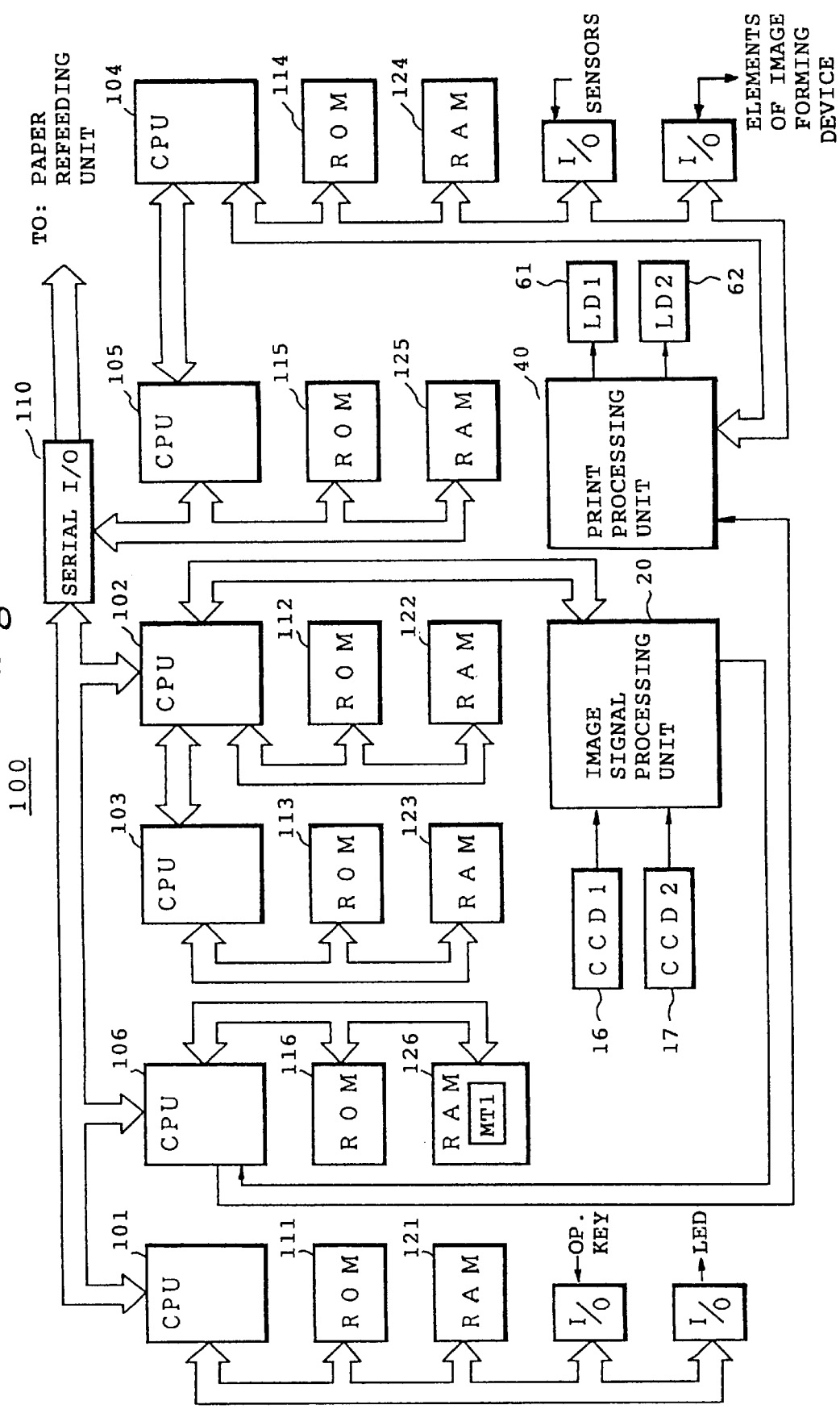
FIG. 3 is a block diagram showing the circuit structure of a control unit of the copier.
Figure 4:
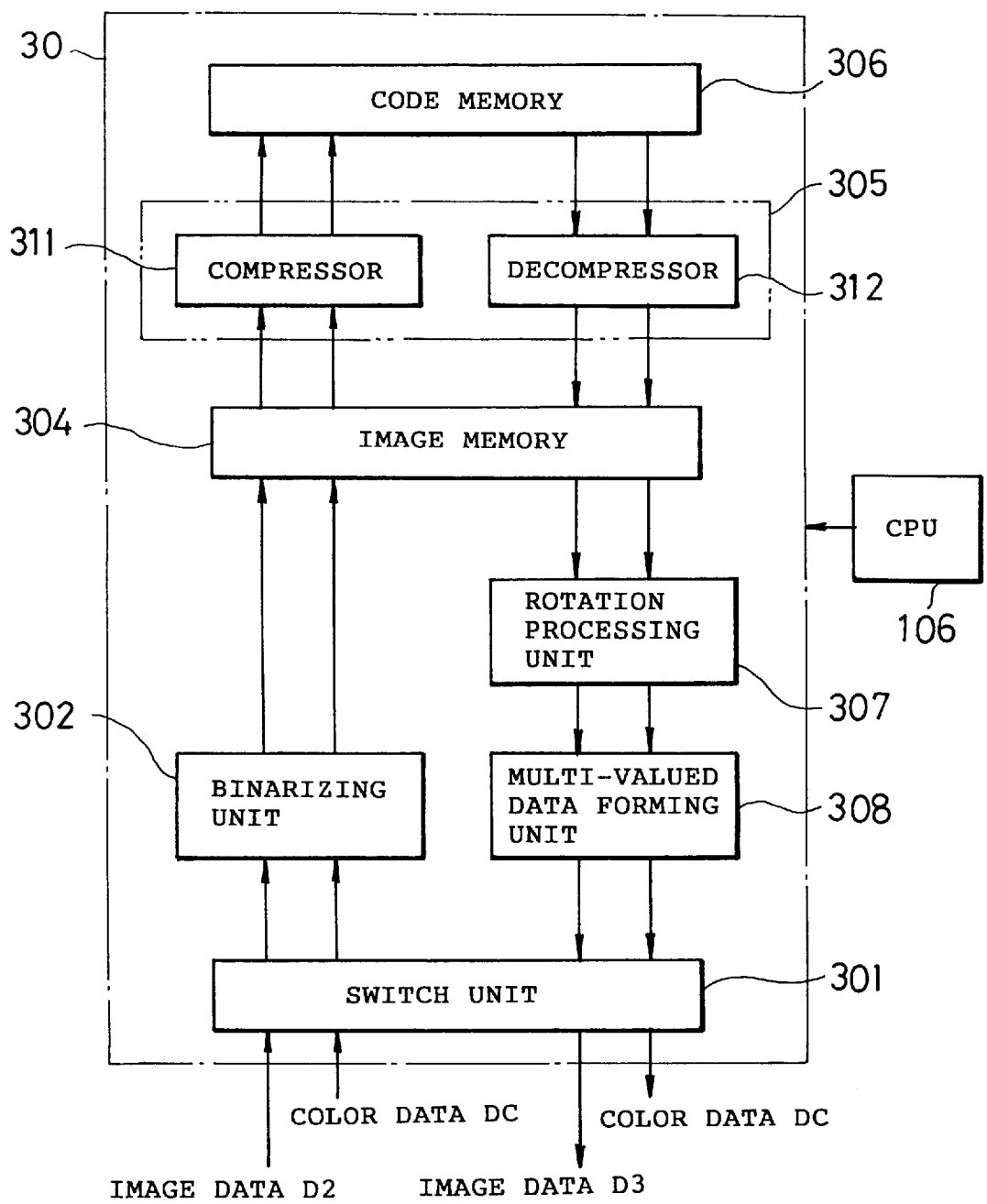
FIG. 4 is a circuit block diagram of a memory unit in the control unit of the copier.

FIG. 3 and FIG. 4 are block diagrams showing the structure of a controlling unit 100 of the copier and the controlling unit 100 is constituted centering on six CPUs 101 through 106. ROMs 111 through 116 each storing programs, RAMs 121 through 126 each becoming an operational area and the like are connected to CPUs 101 through 106.

CPUs 101, 102, 105 and 106 are mutually connected via a serial input/output interface (serial I/O) whereby necessary information is exchanged.

CPU 101 executes a control of input from the various operation keys of the operation panel OP and display output to a display unit. CPU 102 conducts a control of various portions of the image signal processing unit 20 and controls to drive the scanning system 10. CPU 104 controls the printing processing unit 40, the laser optical system 60 and the image forming system 70 and CPU 105 conducts processing for adjusting the overall timing and setting the operational mode of the controlling unit 100.

CPU 106 stores once read image data to an image memory 304 by controlling the memory unit 30 and reads the data to output to the printing processing unit 40.

Next, a brief explanation will be given of respective processing units processing image data.

The image signal processing unit 20 is constituted by a A/D converter, a shading correcting unit, a color determining unit determining the color of pixels of the document based on image data, a magnification changing unit, an image quality correcting unit and the like. The image signal inputted from the photosensitive conversion elements 16 and 17 is A/D-converted, quantized to the image data of 8 bits for each pixel, subjected to various processings such as shading correction, determination of color of pixel, change of magnification, image quality correction and the like and thereafter, outputted as image data D2. Along therewith color data DC of 1 bit indicating whether the color is the designated specific color in accordance with each pixel of the image data D2, is outputted.

Next, an explanation will be given of the memory unit 30.

FIG. 4 is a circuit block diagram of the memory unit 30. The memory unit 30 is constituted by a switch unit 301, a binarizing unit 302 forming binarized data based on parameter setting from CPU 106, a multi-port image memory 304 having the capacity of 2 pages of A4 size paper (paper size of Japanese Industrial Standards) of 400 dpi, a code processing unit 305 having a compressor 311 and a decompressor 312 each operable independently, a code memory 306 having multi-ports, a multi-valued data forming unit 308 forming multi-valued data based on parameter setting from a rotation processing unit 307 and the CPU 106, CPU 106 controlling the total of these and the like.

When the image data D2 is written to the image memory 304, the code processing unit 305 reads the data, forms code data by compressing the read data and writes the code data to the code memory 306. Further, the code memory 306 reads the code data written to the code memory 306 in accordance with the instruction of CPU 106, forms the image data by decompressing the read code data and writes the decompressed image data to the image memory 304.

When image data of 1 page is formed in the image memory 304 by the decompression, the data is read and is subjected to the rotation processing as necessary in the rotation processing unit 307, multi-valued image data is formed at the multi-valued data forming unit 308 and the multi-valued image data is outputted as image data D3. Incidentally, the compressor 311 and the decompressor 312 are operable independently from each other and in parallel with each other and data is transmitted by DMA (direct memory access) respectively between the compressor 311 or the decompressor 312 and the code memory 306.

The code memory 306 is controlled in accordance with a control table MT 1 stored in RAM 126.

Figures 5A, 5B:
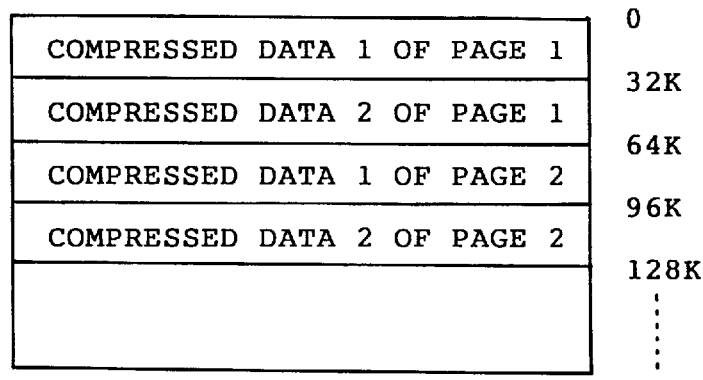
FIGS. 5(a) and 5(b) are diagrams showing a relation between a control table and a code memory.

FIGS. 5(a) and 5(b) are diagrams showing a relation between the control table MT 1 and the code memory 306. The code memory 306 is classified into memory regions each having a unit of 32K byte and code data is stored to the respective regions in consideration of enabling the simultaneous control of the writing operation (in reading image data) and the reading operation (in printing image data). The control table MT 1 for each page stores a number indicating the region of the code memory 306, page number, numbers of connected regions and additional data necessary for compressing and decompressing the data such as the compression system, the length of data and the like and the code memory 306 is dynamically controlled based on these information.

FIG. 5(a) indicates the content of the control table MT 1 where forward connection designates a connected region in the forward direction in the memory region having a unit of 32K byte in one page and whether it is the first region and numeral 00 designate the first region and numerals other than 00 designate the numbers of regions in the forward direction. Further, rearward connection designates a connected region in the rearward direction of the memory region and whether it is the final region and English letters FF designate the final region and numerals designate the numbers of regions in the backward direction.

FIG. 5(*b*) indicates the content of the code memory 306 where, for example, compressed data 1 of page 1 is stored at a memory address 0–32K and compressed data 2 of page 1 is stored at a memory address 32K–64K.

In reading and compressing image data from the image memory 304, CPU 106 forms the information of the control table MT 1 and stores the information to the code memory 306 by controlling the compressor 311. Further, in outputting image data CPU 106 reads the code data from the code memory 306 by the operation inverse thereto. The information in the control table MT 1 is erased when all of the necessary number of copies of the information at the corresponding page has normally been discharged.

[Bookbinding Mode]

Figure 7A:
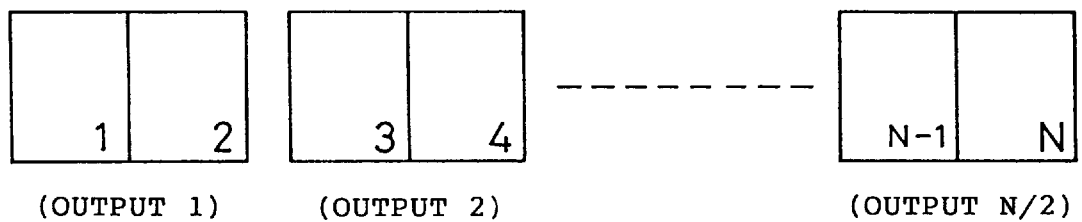
FIGS. 7(a) and 7(b) are diagrams explaining the dual page print mode.
Figure 7B:
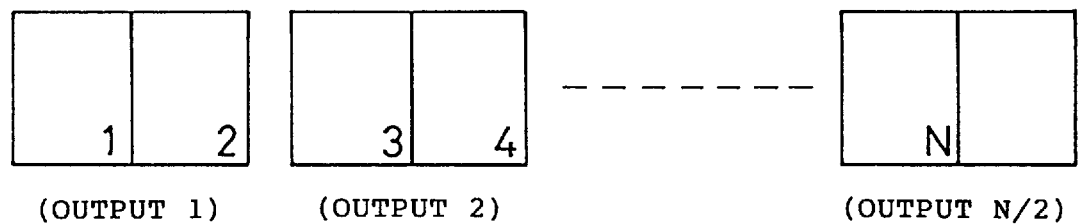
Figure 8A:
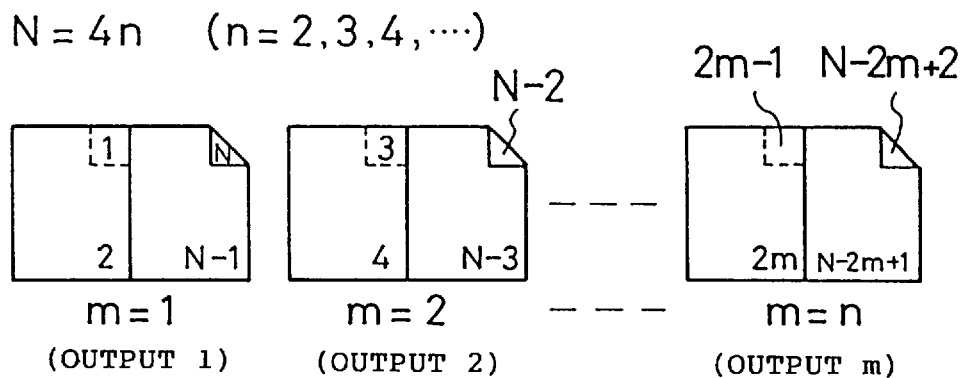
Figure 8B:
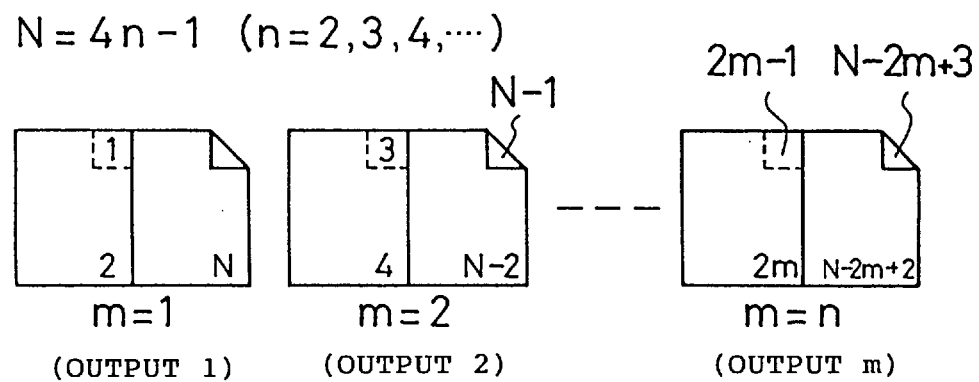

Next, an explanation will be given of specific examples of bookbinding modes in reference to FIG. 6, FIGS. 7(*a*) and 7(*b*), FIGS. 8(*a*), 8(*b*), 8(*c*) and 8(*d*) and FIGS. 9(*a*) and 9(*b*). Firstly, assume that the original documents are provided with a spread A3 size as illustrated in FIG. 6 and they forms a book of N pages including a front cover page (page 1) and a back cover page (last page).

Firstly, an explanation will be given of the conventional case of "dual page print binding" to help understand the bookbinding modes. The printing is conducted in the order of numerals filled in FIGS. 7(*a*) and 7(*b*) on one face of A3 size paper respectively as illustrated in FIG. 7(*a*) when the number N of total pages of the documents is an even number and as illustrated in FIG. 7(*b*) when the number N of total pages of the documents is an odd number. In the case of the "dual page print binding," the bookbinding can be realized by folding in half respective sheets of printed paper at center lines thereof through the above-described processing.

Next, an explanation will be given of the conventional "weekly magazine binding" in reference to FIGS. 8(*a*), 8(*b*), 8(*c*) and 8(*d*). The printing is conducted in the order of numerals filled in the drawings on the both faces of A3 size paper respectively as illustrated in FIG. 8(*a*) when the number N of total pages of the documents is dividable by 4 (N=4n), as illustrated in FIG. 8(*b*) when the number N of total pages produces a residue of 3 when it is divided by 4 (N=4n−1), as illustrated in FIG. 8(*c*) when the number N of total pages produces a residue of 2 when it is divided by 4 (N=4n−2) and as illustrated in FIG. 8(*d*) when the number N of total pages produces a residue of 1 when it is divided by 4 (N=4n−3).

For example, according to FIG. 8(*a*), m designates a variable showing ordinal number of output of record paper. For example, m=1 indicates record paper that is firstly printed and discharged. "2" at the lower portion of the record paper designates that the page number on the first (front) face of the record paper is 2 and "N−1" designates that the page number of the first (front) face of the record paper is N−1. Further, "1" at the upper portion of the record paper designates that the page number of the second (back) face of the record paper is 1 and "N" designates that the page number of the second (back) face of the record paper is N. Numbers in other sheets of the record paper similarly designate the page numbers of the first (front) face or the second (back) face of the record paper.

According to the conventional "weekly magazine binding", a pile of respective sheets of printed paper is folded in half at center lines as they are in the piled state and the fold is bound whereby the bookbinding in the style of weekly magazine can be realized through the above-described processing.

Next, an explanation will be given of the "weekly magazine binding" in accordance with the present invention. According to the "weekly magazine binding" in this invention when the document is constituted by the spread A3 size as illustrated in FIG. 6, a sheet of paper of A3 size is used for portions constituting the cover page and the back cover page and intermediate pages are formed by using sheets of paper of A4 size which are inserted between the cover page and the back cover page.

FIGS. 9(*a*) and 9(*b*) are views explaining the "weekly magazine binding" in accordance with the present invention. Firstly, when the number N of a total of pages of the document is dividable by 2 (N=2n), as illustrated in FIG. 9(*a*), paper of A3 size is used for the first portion of the document (output variable m=1). A content of page number 1 (front face of cover page) is printed on a half of the first face (left side back face in this drawing), a content of page number 2 (inner face of cover page) is printed on a half of the second face of the record paper (left side front face in the drawing), a content of page number N−1 (inner face of back cover page) is printed on a residual half of the second face of the record paper (right side front face in the drawing) and a content of page number N (outer face of back cover page) is printed on a residual half of the first face of the record paper (right side back face in the drawing).

Next, record paper of A4 size is used for intermediate pages. A content of page number 3 is printed on the first face (back face in the drawing) of output 2 (output variable m=2), a content of page number 4 is printed on the second face (front face in the drawing), and the printing is successively and similarly carried out and a content of page number 2m−1 is printed on the first face of output m (output variable m=n of the record paper and a content of page number 2m is printed on the second face thereof.

In the case where a residue of 1 is produced when the number N of a total of pages of the document is divided by 2 (N=2n−1), as illustrated in FIG. 9(*b*), a sheet of record paper of A3 size is used for the first output (output variable m=1). A content of page number 1 (front face of cover page) is printed on a half of the first face (left side back face in the drawing), a content of page number 2 (inner face of cover page) is printed on a half of the second face of the record paper (left side front face in the drawing), a residual half of the second face of the record paper (right side front face in the drawing) is rendered a blank (inner face of back cover page) and a content of page number N (outer face of back cover page) is printed on a residual half of the first face of the record paper (right side back face in the drawing).

Next, with regards to the intermediate pages, quite similar to the above-described case where the number of pages of the document is dividable by 2, a content of page number 3 is printed on the first face of the record paper of A4 size (output variable m=2), a content of page number 4 is printed on the second face, the printing is carried out successively and a content of page number 2m−1 is printed on the first face of the record paper (output variable m=n) and a content of page number 2m is printed on the second face.

By using the above-described processing, according to the "weekly magazine binding" of this invention, printed matter corresponding to the front face of the cover page, the back face of the cover page, the back face of the back cover page and the front face of the back cover page are formed by using one sheet of A3 size record paper, printed matter of A4 size record paper is interposed between sheets of the A3 size record paper which are folded in two and the fold is bound whereby the book binding in the style of the weekly magazine binding can be realized.

[Control Operation]

Next, an explanation will be given of the operation of the copier in reference to FIGS. 10, 11, 12, 13, 14, 15(a), 15(b), 16(a), 16(b), 16(c), 17, 18, 19, 20 and 21. Firstly, an explanation will be given of main routines executed by CPUs 101 through 106 and thereafter, an explanation will be given of subroutines in the main routines.

Figure 10:
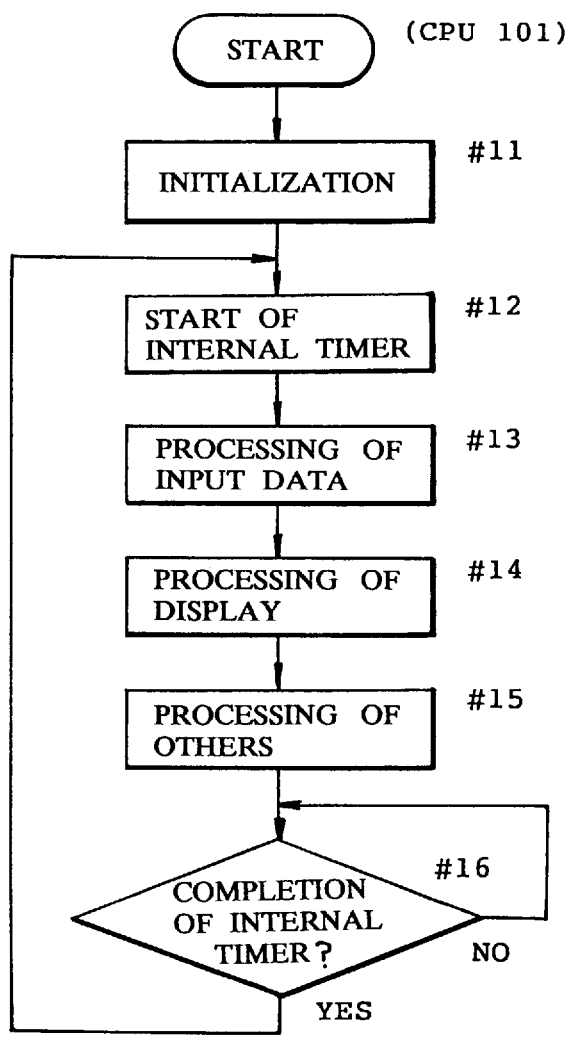
FIG. 10 is a flowchart of a main routine executed at CPU 101 controlling various key inputs and display outputs to a display unit of the operation panel.

FIG. 10 is a flowchart of a main routine executed by CPU 101 controlling various input keys on the operation panel OP, input signals from various sensors and a display output to a display unit on the operation panel OP. First, initial setting is conducted (step #11) and counting is started by setting an internal timer for making constant the processing time of one routine (step #12).

Input data from various switches etc. of the operation panel OP, various sensors inside of the copier and the like are processed (step #13), display in respect of the liquid crystal display panel on the operation panel OP is processed (step #14), control of other inner mechanisms is processed (step #15), completion of counting of the internal timer is awaited (step #16) and the operation returns to step #12. Further, communication between CPU 101 and other CPUs 102 through 106 is carried out by interruption.

Figure 11:
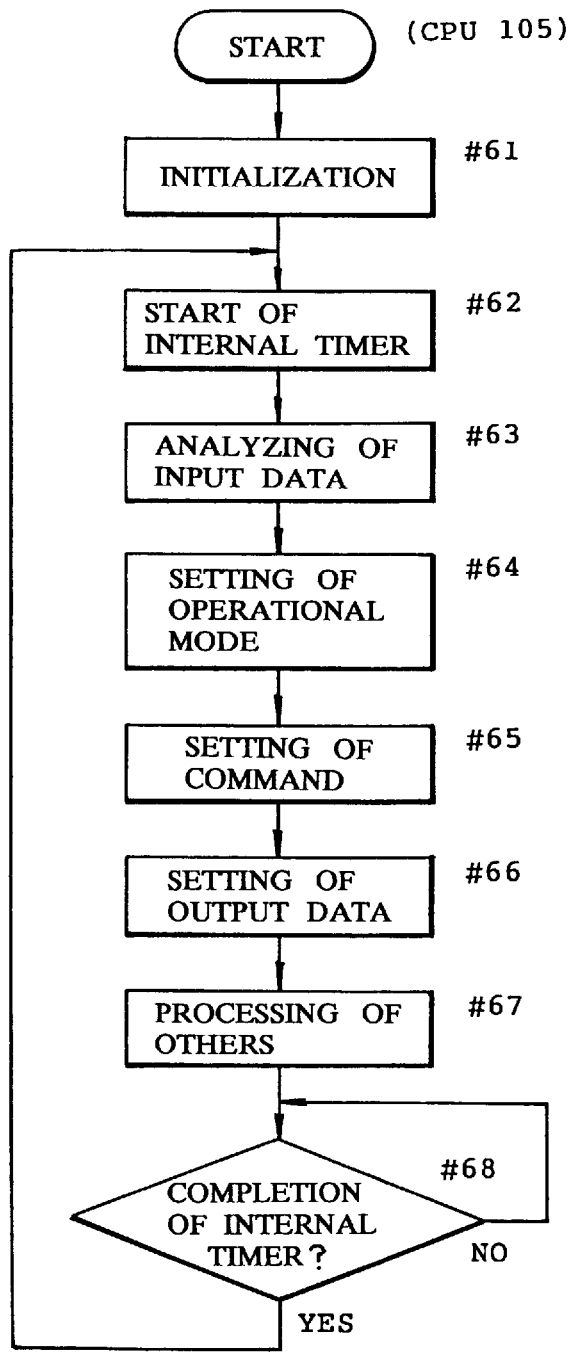
FIG. 11 is a flowchart of a main routine executed at CPU 105 controlling the operation of the total of the copier.

FIG. 11 is a flowchart of a main routine executed by CPU 105 setting command of start and stop and operational modes in respect of other CPUs thereby controlling the operation of a total of the copier 1. Firstly, initial setting is conducted (step #61) and counting is started by setting an internal timer (step #62).

Content of various data inputted by interruption is analyzed (step #63) and mode is set when the operational mode is changed (step #64).

Command of writing, reading or the like in respect of memories is set in accordance with a set copy mode (step #65), data for outputting by interruption is set (step #66) and other processings are carried out (step #67). Completion of counting of the internal timer is awaited (step #68) and the operation returns to step #62.

Figure 12:
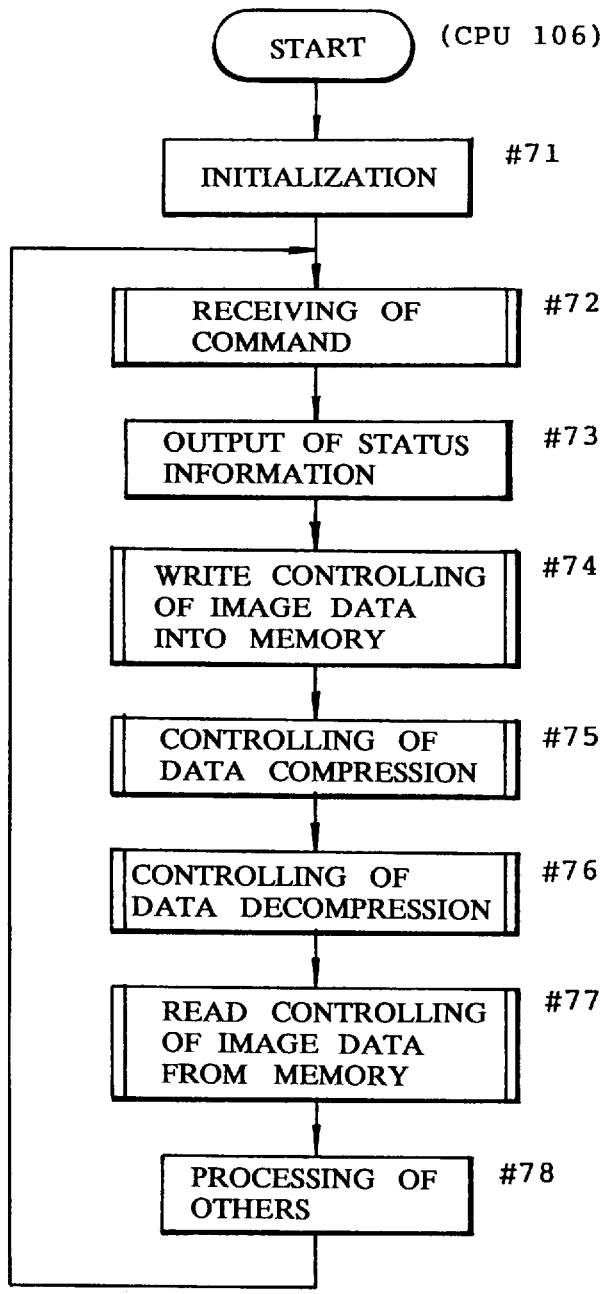
FIG. 12 is a flowchart of a main routine executed at CPU 106 controlling the memory unit.

FIG. 12 is a flowchart of a main routine executed by CPU 106 controlling the memory unit 30. Firstly, initial setting is conducted (step #71), command from other CPUs is received (step #72) and information relating status is sent (step #73). Furthermore, writing control of image data into the image memory (step #74), controlling of data compression (step #75), controlling of data decompression (step #76), control of reading image data from the image memory (step #77) and other processes (step #78) are carried out and the operation returns to step #72.

Figure 13:
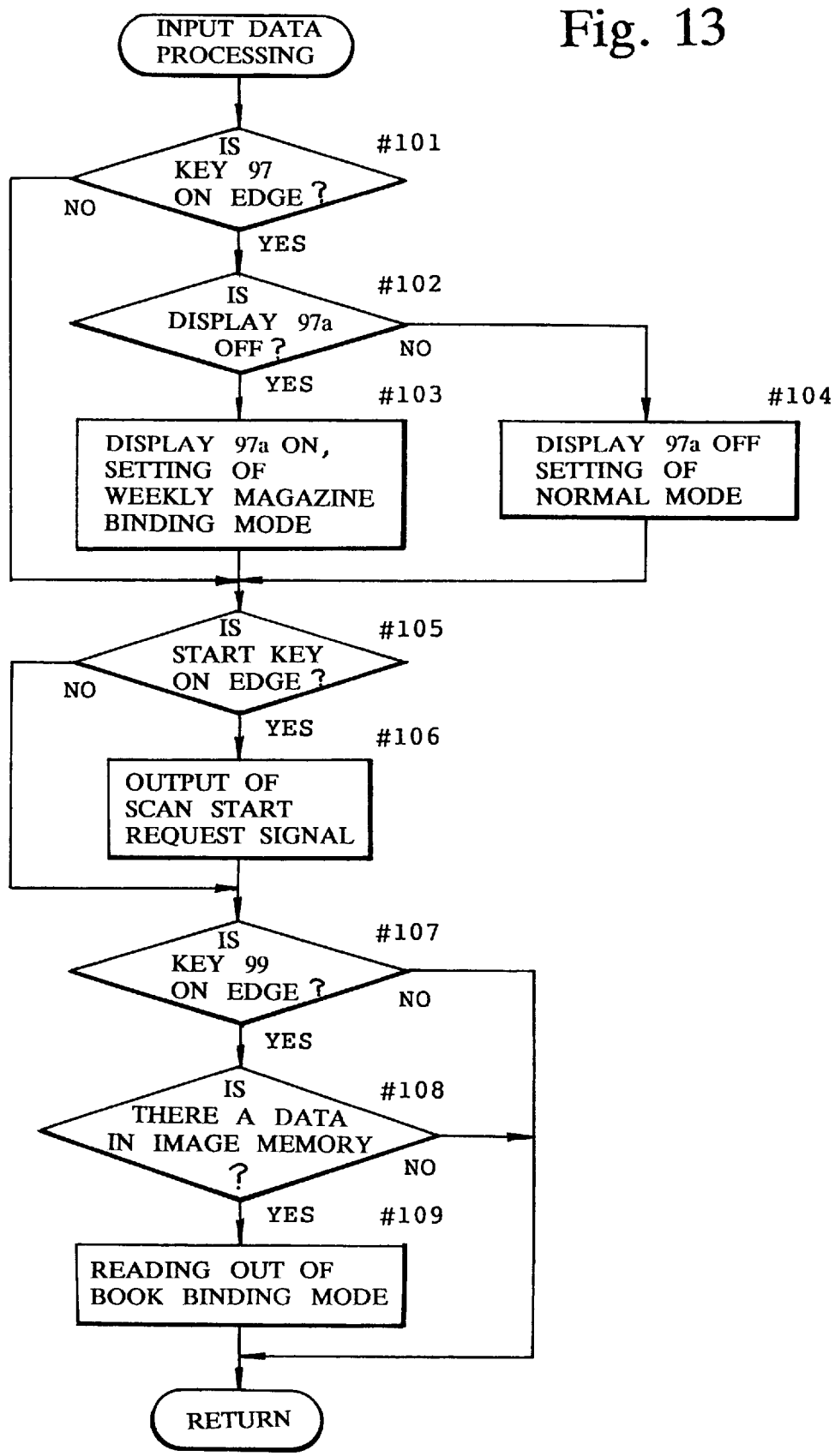
FIG. 13 is a flowchart showing details of the control operation of input signals.

FIG. 13 is a flowchart showing details of processing of input data that is illustrated in the flowchart of FIG. 10 as step #13.

Firstly, the selected set state of the book binding mode (weekly magazine binding or normal copying) is determined by ON edge of the bookbinding mode setting key 97 (step #101), in the case of ON edge, the state of display unit 97a showing the selection of the weekly magazine binding mode is determined (step #102). When the display unit 97a is turned OFF, the display unit 97a is turned ON whereby the weekly magazine binding mode is set (step #103). When the display unit 97a is turned ON by the determination in step #102, the display unit 97a is turned OFF and the normal mode is set (step #104).

Whether the start key 96 on the operation panel instructing to start copying is pushed, is determined by ON edge of the starter key 96 (step #105) and if it is ON edge, scan start request signal is outputted (step #106).

The termination of reading all the documents is determined by ON edge of the read finish key 99 on the operation panel (step #107), if it is ON edge, the presence of data in the image memory is confirmed (step #108), operation of reading the bookbinding mode is started (step #109) and the operation returns to the main routine. When the read finish key 99 is not at ON edge by the determination of step #107 and when data is not present in the image memory in the determination of step #108, the operation immediately returns to the main routine.

Figure 14:
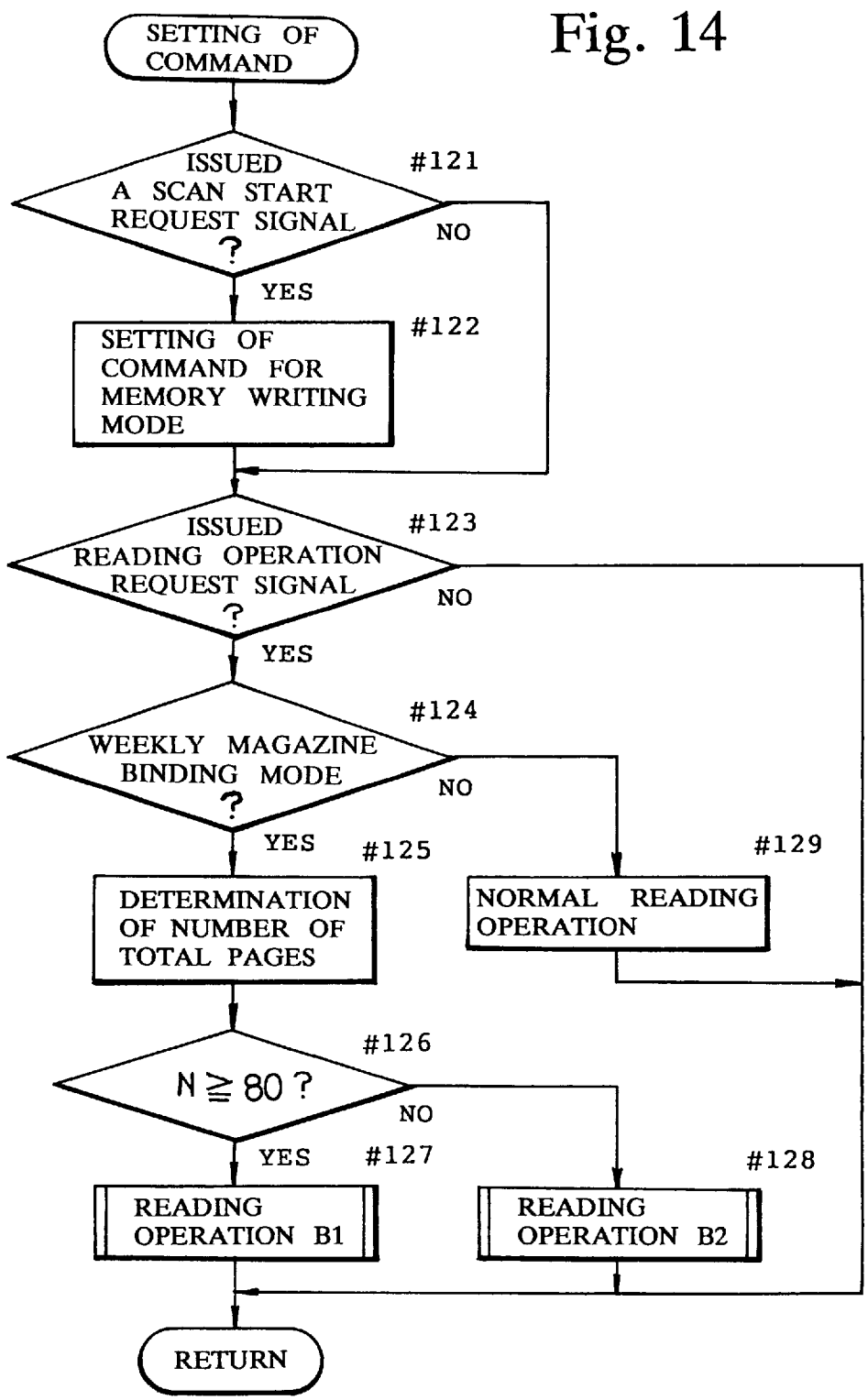
FIG. 14 is a flowchart showing details of command setting necessary for memory reading operation in the case of the weekly magazine binding mode.

FIG. 14 is a flowchart showing details of command setting which is illustrated in the flowchart of FIG. 11 as step #65. According to this embodiment, when the number of total pages of the document exceeds 80 sheets (that is 20 sheets of record paper in the conventional weekly magazine binding), the control is conduced such that the mode of the weekly magazine binding in accordance with the present invention is selected and when the number of total pages of the document is equal to or less than 80 sheets, the control is conducted such that the mode of the conventional weekly magazine binding is selected.

Firstly, the presence or absence of the scan start request signal is determined (step #121) and when the scan start request signal is issued, a command necessary for writing memory mode is set (step #122). The presence or absence of request signal for reading operation is determined (step #123) and when the request for reading operation signal is issued, whether the weekly magazine binding mode is set by operating the key 97 on the operation panel or not, is determined (step #124).

When the weekly magazine binding mode is set, the number N of a total of pages for writing is determined from the number of sheets of the document and whether the number exceeds 80 sheets is determined (steps #125 and #126). When the number exceeds 80 sheets, reading operation B1, mentioned later, is executed (step #127), when the number is equal to or less than 80 sheets, reading operation B2, mentioned later, is executed (step #128) and the operation returns to the main routine.

Further, when the weekly magazine binding mode is not set by the determination at step #124, normal reading operation is executed (step #129) and the operation returns to the main routine.

FIGS. 15(a) and 15(b) and FIGS. 16(a), 16(b) and 16(c) are flowcharts showing details of the "reading operation B1" setting command necessary for memory reading operation in the case of the weekly magazine binding in accordance with the present invention which is illustrated in the flowchart of FIG. 14 as step #127.

Firstly, reading states are determined (steps #301, #302 and #303) and operation moves to steps specified by the corresponding read state numbers.

When the reading state is 0, it signifies preparation of portions of printed matter constituting the front face of the cover page and the back face of the back cover page in the weekly magazine binding mode of the present invention. Firstly, the number N of total pages written to the memory is set as the variable indicating the number of total pages of image data (step #311).

Figure 9A:
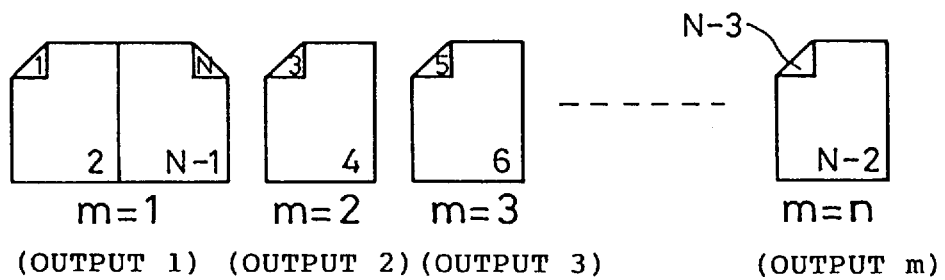
FIGS. 9(a) and 9(b) are diagrams explaining the weekly magazine binding mode of the present invention.
Figure 9B:
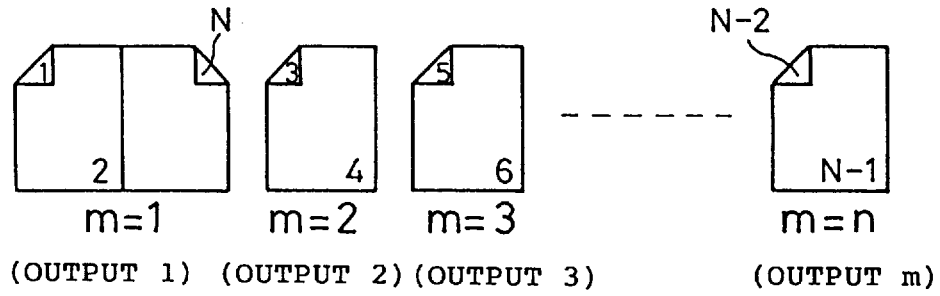

Whether the number N of total pages is dividable by 2 or not is determined (step #312), when it is dividable, (N/2−1) is substituted for the number n of outputs when the document is outputted in accordance with the weekly magazine binding mode of the present invention (step #313) and when it is not dividable, (N/2) is substituted for the number n of outputs (step #314) (refer to FIGS. 9(a) and 9(b)) and 1 is substituted for the variable m designating the ordinal number of the output of the record paper (step #315).

Page number "2" is registered to a decompression request buffer (step #316), whether the number N of total pages is dividable by 2 or not is determined (step #317), when it is dividable, it corresponds to the page constitution in FIG. 9(a) in the weekly magazine binding mode of the present invention and therefore, page number "N−1" is registered to the decompression request buffer (step #318) and when number N of total pages is not dividable by 2, it corresponds to the page constitution of FIG. 9(b) and therefore, page number "N" is registered to the decompression request buffer (step #319).

Successively, print request in respect of the "front face" of the record paper and A3T (A3 size with long size thereof set in the paper feeding direction) as the size of record paper, are registered to print request buffer (steps #320 and #321), the reading state is updated to 1 (step #322) and the operation returns to the main routine.

When the reading state is 1, it signifies preparation of printing portions of document constituting the back face of the cover page and the back face of the back cover page in the weekly magazine binding mode of the present invention. Firstly, whether paper feed answer is received is determined (step #331). When the paper feed answer is received, page number "1" is registered to the decompression request buffer for processing in respect of the back face of the first sheet of record paper (step #332).

Next, whether the number N of a total of pages is dividable by 2 is determined (step #333), when it is dividable, it corresponds to the page constitution of FIG. 9(a) in the weekly magazine binding mode of the present invention and therefore, page number "N" is registered to the decompression request buffer (step #334) and when the number N of a total of pages is not dividable by 2, it corresponds to a blank portion in the page constitution of FIG. 9(b) and therefore, no page number is registered to the decompression request buffer.

Successively, print request in respect of the back face of the record paper is registered to the print request buffer (step #335), the reading state is updated to 2 (step #336), (m+1) is substituted for the variable m indicating the ordinal number of the output of the record paper (step #337) and the operation returns to the main routine.

Figure 15A:
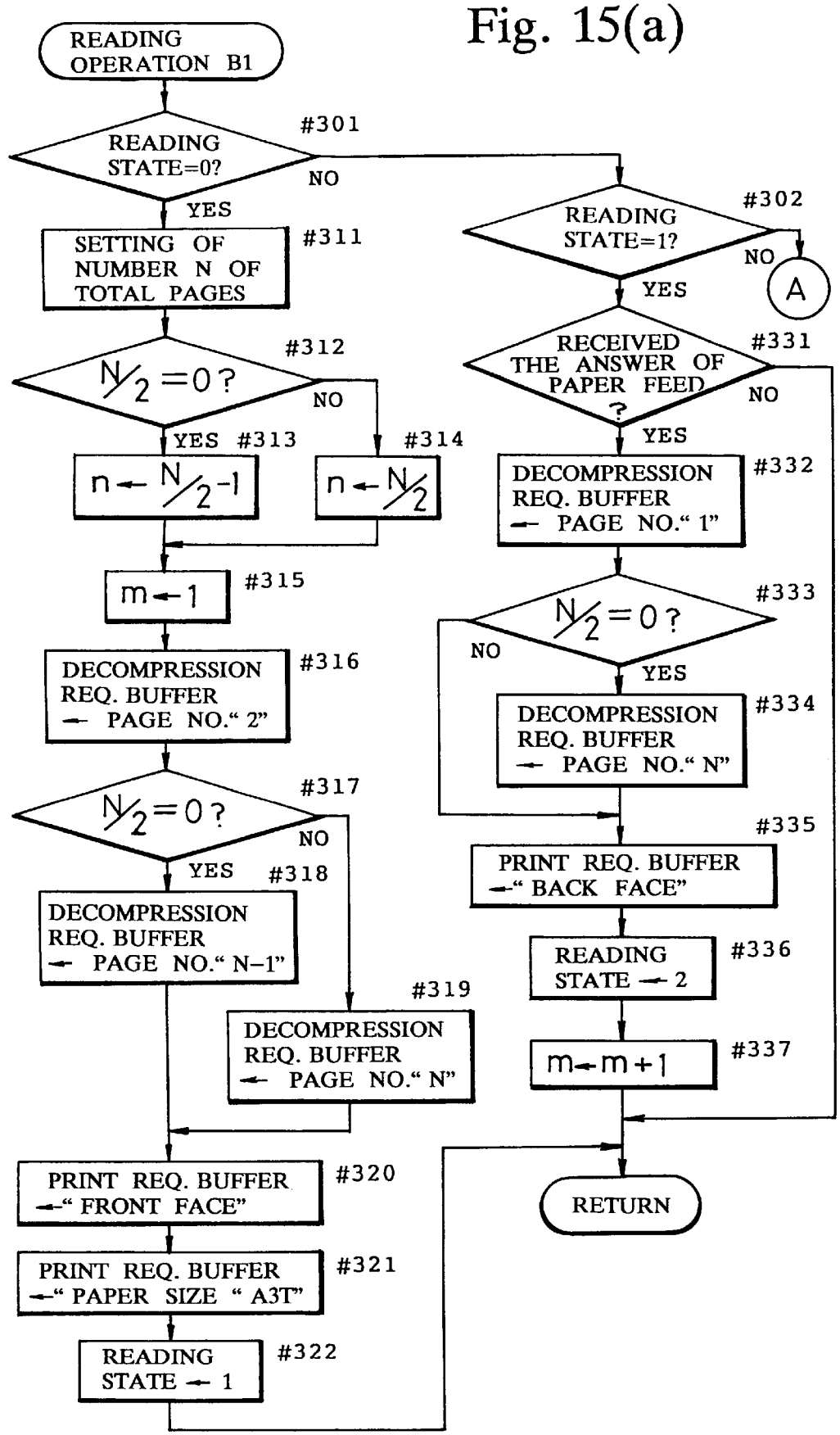
FIGS. 15(a) and 15(b) are flowcharts showing details of command setting necessary for memory reading operation of the weekly magazine binding mode B1 according to the present invention.
Figure 15B:
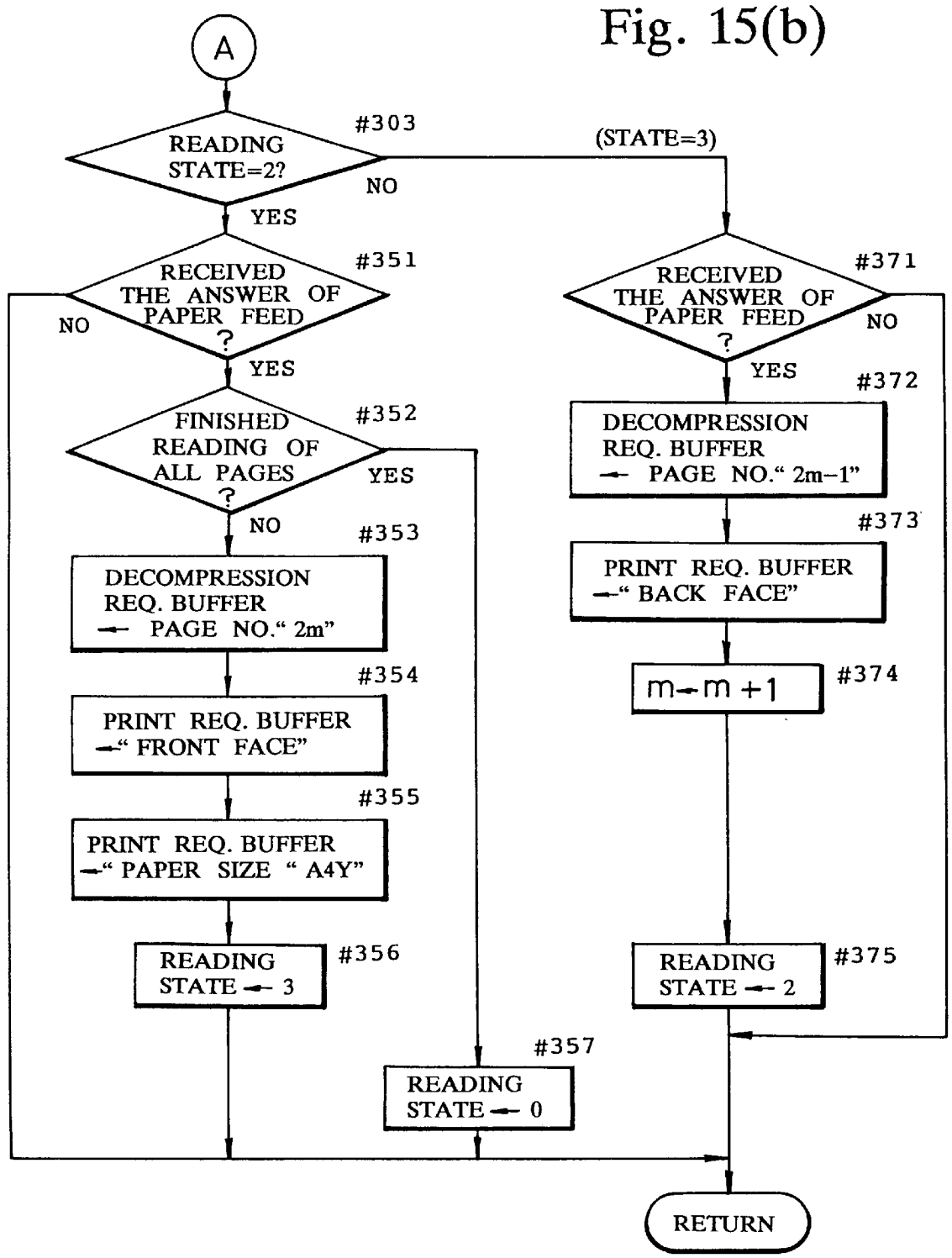

When the reading state is 2 (refer to FIG. 15(b)), it signifies preparation of print in respect of the first face (front face) in the intermediate pages other than the cover page and the back cover page in the weekly magazine binding mode of the present invention. Firstly, whether answer of paper feed for the print request in respect of the front face of record paper is received or not is determined (step #351). When the paper feed answer is received, whether reading of all the pages is finished is determined (step #352), when it is not finished, page number "2m" is registered to the decompression request buffer (step #353), print request in respect of the "front face" of the record paper and A4Y (A4 size with short size thereof set in the paper feeding direction) as the size of the record paper, are registered to the print request buffer (steps #354 and #355), the reading state is updated to 3 (step #356) and the operation returns to the main routine.

When the answer of paper feed is not received in the determination of step #351, the operation immediately returns to the main routine. When the reading of all the pages is finished in the determination of step #352, paper feeding of all the record paper is finished and therefore, the reading state is updated to 0 (step #357) and the operation returns to the main routine.

When the reading state is 3, it signifies preparation of print in respect of the second face (back face) of the intermediate page. Firstly, whether answer of paper feed for the print request in respect of the back face of the record paper is received or not, is determined (step #371). The page constitution remains unchanged as illustrated in FIGS. 9(a) and 9(b) when the number of a total of pages of the document is an odd number as well as when it is an even number and accordingly, page number "2m−1" is registered to the decompression request buffer (step #372), the print request in respect of the "back face" of the record paper is registered to the print request buffer (step #373), (m+1) is substituted for the variable m indicating the ordinal number of the output of the record paper (step #374), the reading state is updated to 2 (step #375) and the operation returns to the main routine.

Figure 16A:
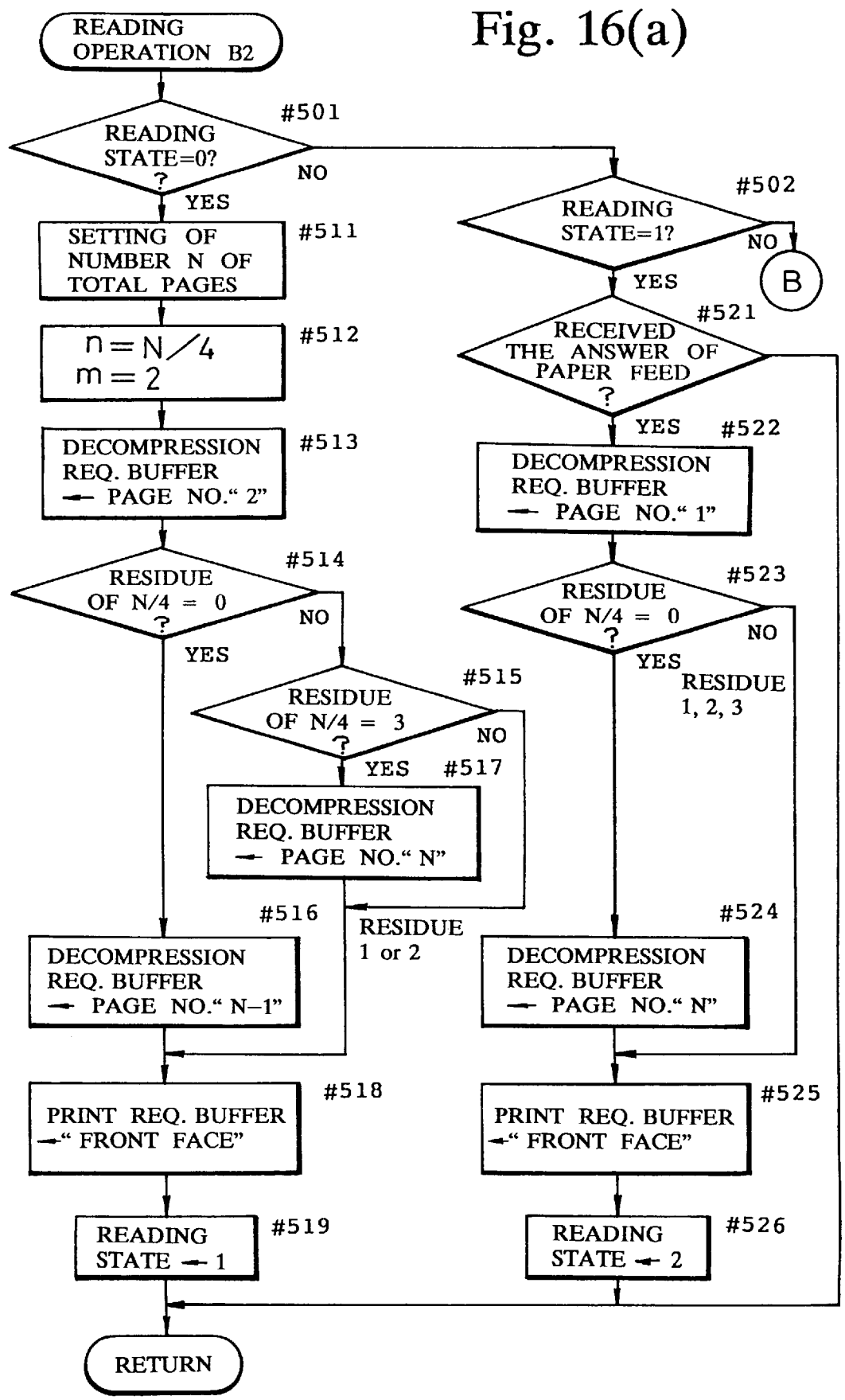
FIGS. 16(a), 16(b) and 16(c) are flowcharts showing details of command setting necessary for memory reading operation in the case of the conventional weekly magazine binding mode B2.
Figure 16B:
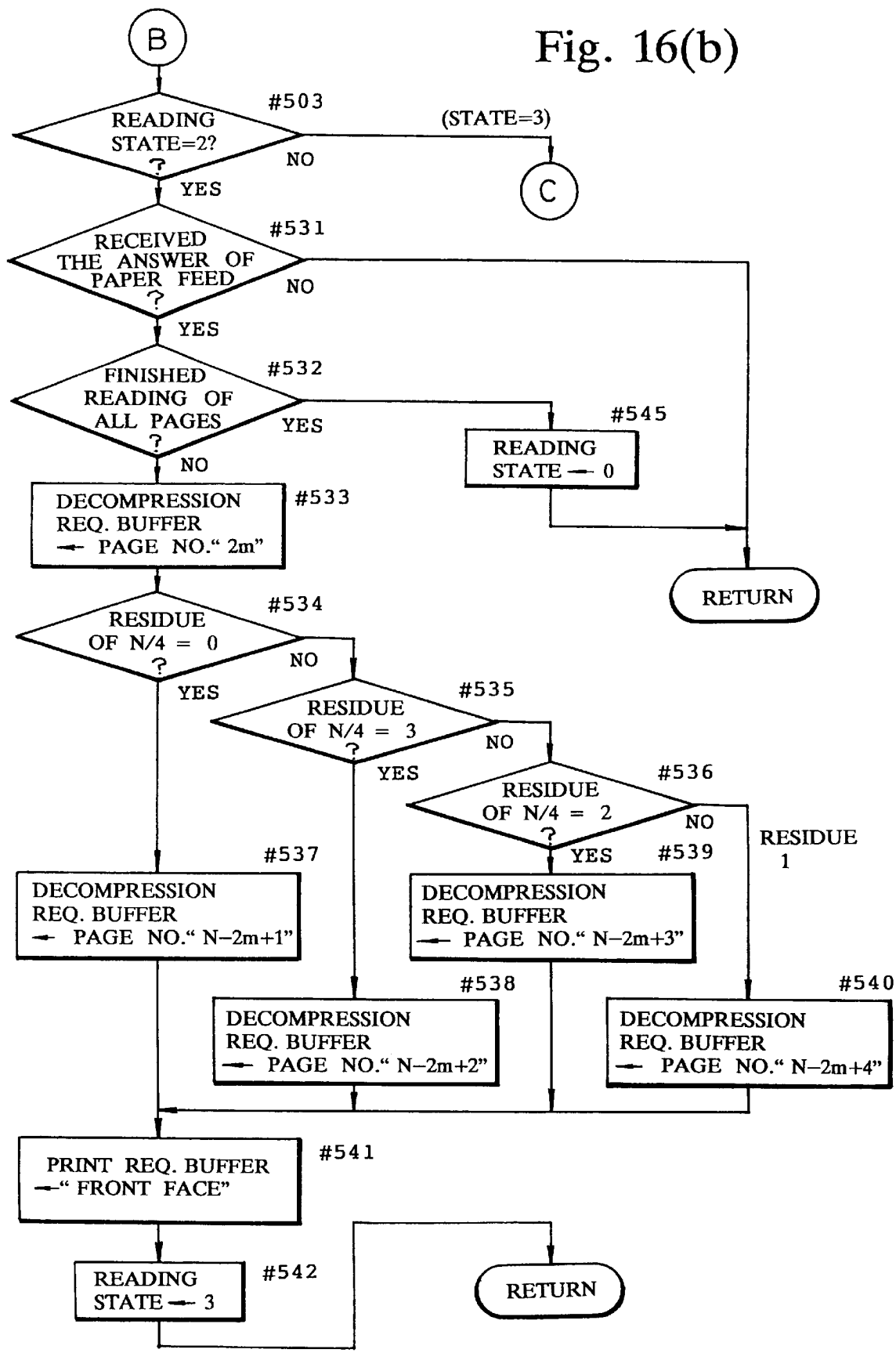
Figure 16C:
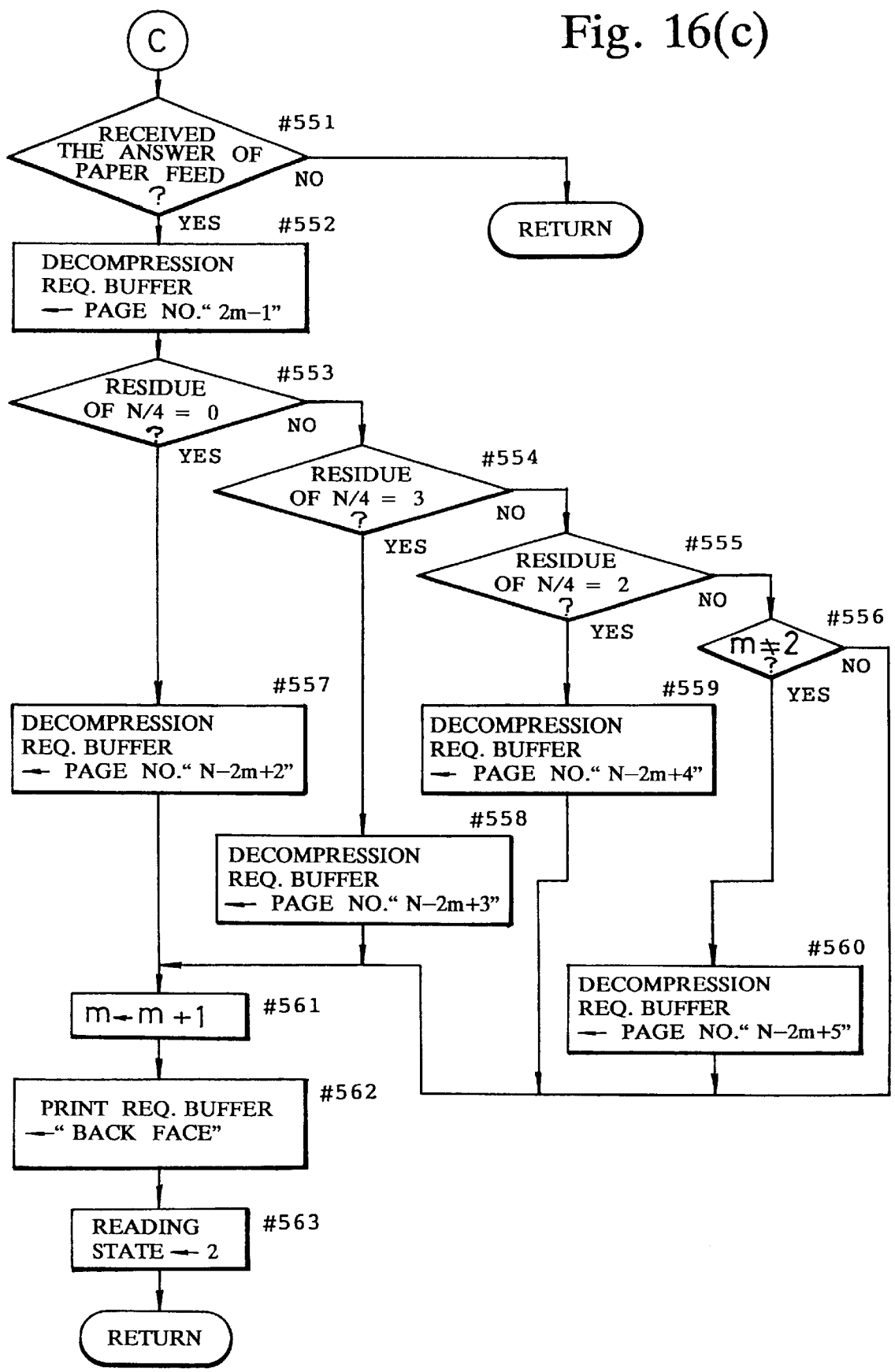

FIGS. 16(a), 16(b) and 16(c) are flowcharts showing details of the "reading operation B2" setting command necessary for memory reading operation in the case of the conventional weekly magazine binding which is illustrated in the flowchart of FIG. 14 as step #128. Here, the decompression request and the print request are set to produce the output modes as illustrated in FIGS. 8(a), 8(b), 8(c) and 8(d).

Firstly, the reading states are determined (steps #501, #502 and #503) and the operation moves to the corresponding read state numbers.

When the reading state is 0, the number N of total pages written to the memory as the variable indicating the number of the total pages of the image data is set (step #511).

Successively, a value of an integer that is produced by dividing the number N of total pages by 4 is substituted for the variable n and 2 is substituted for the valuable m indicating the ordinal number of the output of the record paper (step #512). Page number "2" is registered to the decompression request buffer (step #513).

Next, whether a residue that is produced by dividing the number N of total pages by 4 is 0 or 3 is determined (steps #514 and #515). When the residue is 0, the page constitution corresponds to that in FIG. 8(a) and therefore, page number "N−1" is registered to the decompression request buffer (step #516) and when the residue is 3, it corresponds to that in FIG. 8(b) and therefore, the page number "N" is registered to decompression request buffer (step #517). Further, if the residue is not 0 nor 3, that is, 1 or 2, it corresponds to the blank portions in FIGS. 8(c) and 8(d) and therefore, no page number is registered to the decompression request buffer.

Successively, the print request in respect of the front face of the record paper is registered to the print request buffer (step #518), the reading state is updated to 1 (step #519) and the operation returns to the main routine.

When the reading state is 1, firstly, whether the paper feed answer is received or not is determined (step #521). When the paper feed answer is received, page number "1" is registered to the decompression request buffer for processing in respect of the back face of the first sheet of the record paper (step #522).

Next, whether the residue that is produced by dividing the number N of total pages by 4 is determined (step #523). When the residue is 0, it corresponds to the constitution of FIG. 8(a) and therefore, page number "N" is registered to the decompression request buffer (step #524) and when the residue is a number other than 0, that is, 1 or 2 or 3, no page number is registered to the decompression request buffer.

Successively, the print request in respect of the back face of the record paper is registered to the print request buffer (step #525), the reading state is updated to 2 (step #526) and the operation returns to the main routine.

When the reading state is 2 (refer to FIG. 16(b)), firstly, whether answer of paper refeed is received for print request in respect of the reverse face of the record paper is determined (step #531). When the paper refeeding answer is received, whether the reading of all the pages is finished or not is determined (step #532). When it is not finished, page number "2m" is registered to the decompression request buffer (step #533).

Next, whether the residue that is produced by dividing the number N of a total of pages by 4 is determined (steps #534, #535 and #536). When the residue is 0, it corresponds to the constitution of FIG. 8(a) and accordingly, page number "N−2m+1" is registered to the decompression request buffer (step #537) and when the residue is 3, it corresponds to the constitution of FIG. 8(b) and therefore, page number "N−2m+2" is registered to the decompression request buffer (step #538).

Further, if the residue is 2, it corresponds to constitution of FIG. 8(c) and therefore, page number "N−2m+3" is registered to the decompression request buffer (step #539) and when the residue is 1, it corresponds to the constitution of FIG. 8(d) and therefore, page number "N−2m+4" is registered to decompression request buffer (step #540).

The print request in respect of the front face of record paper is registered to the print request buffer (step #541), the reading state is updated to 3 (step #542) and the operation returns to the main routine.

When the paper feeding answer is not received in the determination of step #531, the decompression request buffer is not updated and the print request buffer is not updated.

When the reading of all the pages is finished in the determination of step #532, it signifies that the feeding of all the record paper is finished and therefore, the reading state is updated to 0 (step #545) and the operation returns to the main routine.

The processing in the case where the reading state is 3 (refer to FIG. 16(c)), indicates the reading of data from the memory for the printing operation on the back face of the record paper after the printing operation in respect of the front face of the record paper has been finished.

Firstly, whether the answer of paper feed is received or not is determined (step #551) and when the paper feed answer is received, page number "2m−1" is registered to the decompression request buffer (step #552).

Next, the residue that is produced by dividing the number N of a total of pages by 4 is determined (steps #553, #554 and #555). When the residue is 0, it corresponds to the constitution of FIG. 8(a) and accordingly, page number "N−2m+2" is registered to the decompression request buffer (step #557), when the residue is 3, it corresponds to the constitution of FIG. 8(b) and therefore, the page number "N−2m+3" is registered to the decompression request buffer (step #558), when the residue is 2, it corresponds to the constitution of FIG. 8(c) and therefore, page number "N−2m+4" is registered to the decompression request buffer (step #559).

When the residue is 1, whether the ordinal number of the sheet of paper is at the second order (m≠2) or not is determined (step #556) and when m≠2, it corresponds to the constitution of FIG. 8(d) and therefore, the page number "N−2m+5" is registered to the decompression request buffer (step #560). Further, if not m≠2, no page number is registered to the decomposition request buffer.

The number m of the record paper is updated by 1 (step #561), the print request in respect of the reverse face of the record paper is registered to the print request buffer (step #562), the reading state is updated to 2 (step #563) and the operation returns to the main routine.

When the paper feeding answer is not received in the determination of step #551, the decompression request buffer is not updated and the print request buffer is not updated.

Figure 17:
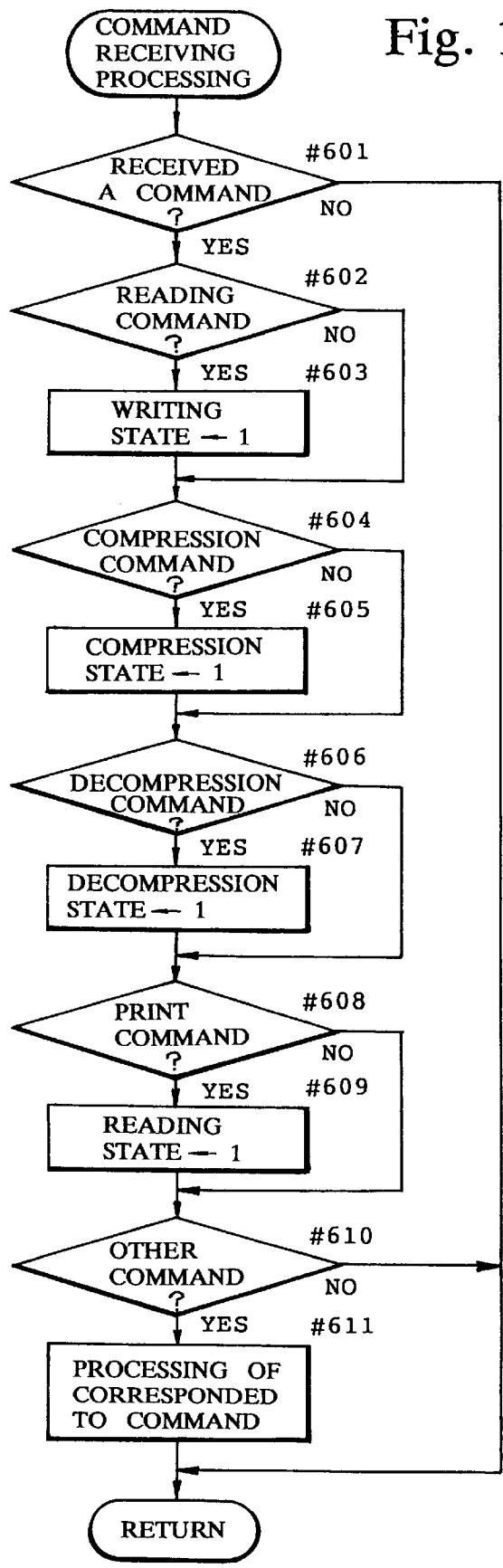
FIG. 17 is a flowchart showing details of command receiving.

FIG. 17 is a flowchart showing details of command receiving processing that is shown in the flowchart of FIG. 12 as step #72.

The presence or absence of the receiving of command is determined (step #601) and when it is received, the following processings are performed in accordance with the kind of the command.

In the case of the reading command, a writing state is set to 1 (steps #602 and #603). In the case of the compression command a compression state is set to 1 (steps #604 and #605). In the case of the decompression command a decompression state is set to 1 (steps #606 and #607).

Further, in the case of the printing command a reading state is set to 1 (steps #608 and #609). In the case of other command the processing in correspondence with the other command is executed (steps #610 and #611) and the operation returns to the main routine.

Figure 18:
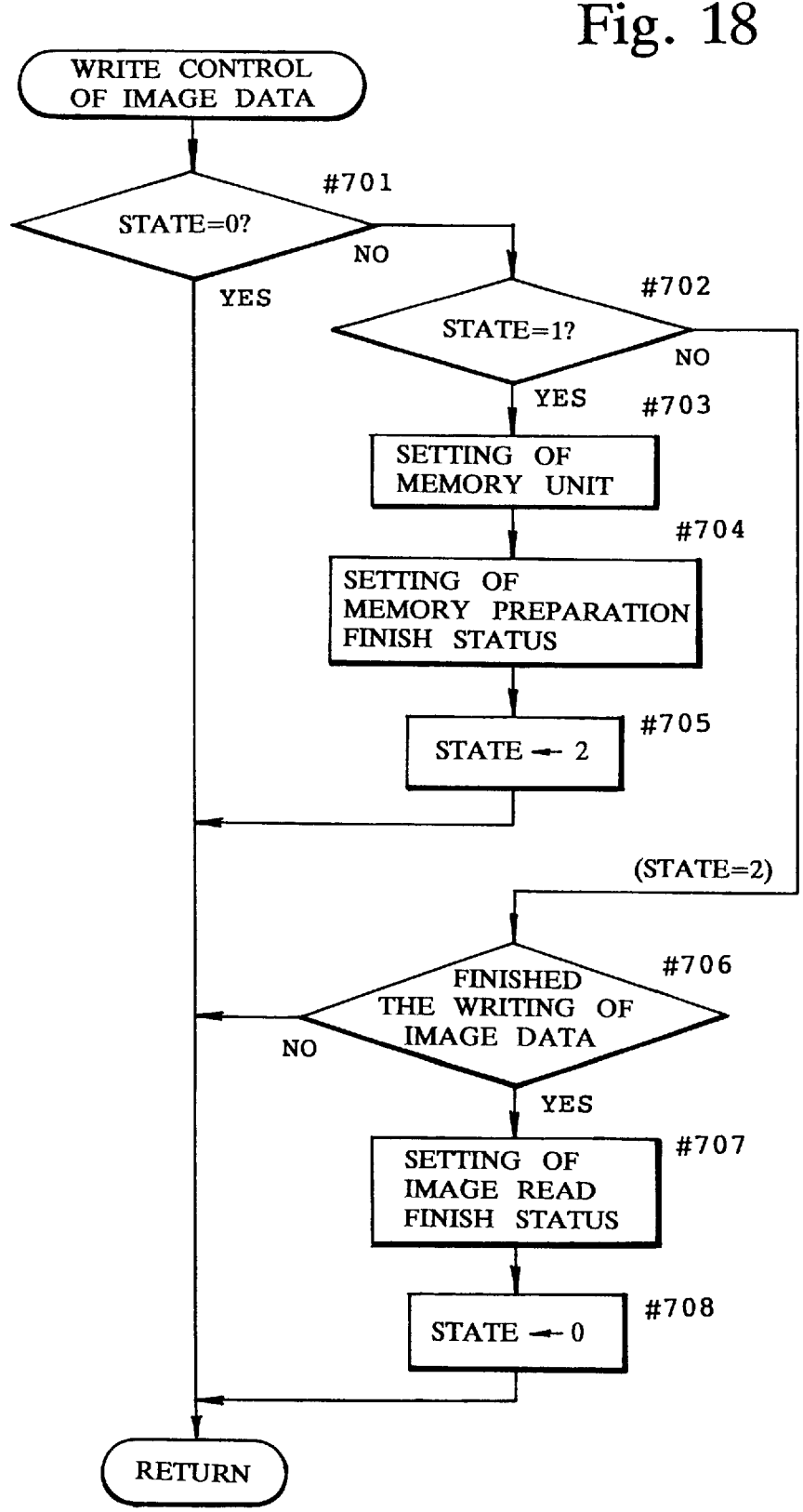
FIG. 18 is a flowchart showing details of image memory writing control.

FIG. 18 is a flowchart showing details of the writing control of the image memory that is shown in the flowchart of FIG. 12 as step #74.

Firstly, the state number is determined (steps #701 and #702) and the operation moves to the corresponding state numbers.

When the state number is 0, the operation immediately returns to the main routine without performing any processing.

When the state number is 1, the setting processing of the memory unit is conducted, that is, write start address for writing to the image memory 304, XY length information, image processing parameters and the like are set (step #703), memory preparation finish status is set (step #704), the state number is set to 2 (step #705) and the operation returns to the main routine.

When the state number is 2, whether the writing to the image memory 304 is finished or not is determined (step #706), when the writing is not finished, the operation immediately returns to the main routine, when it is finished, read finish status is set (step #707), the state number is set to 0 (step #708) and the operation returns to the main routine.

Figure 19:
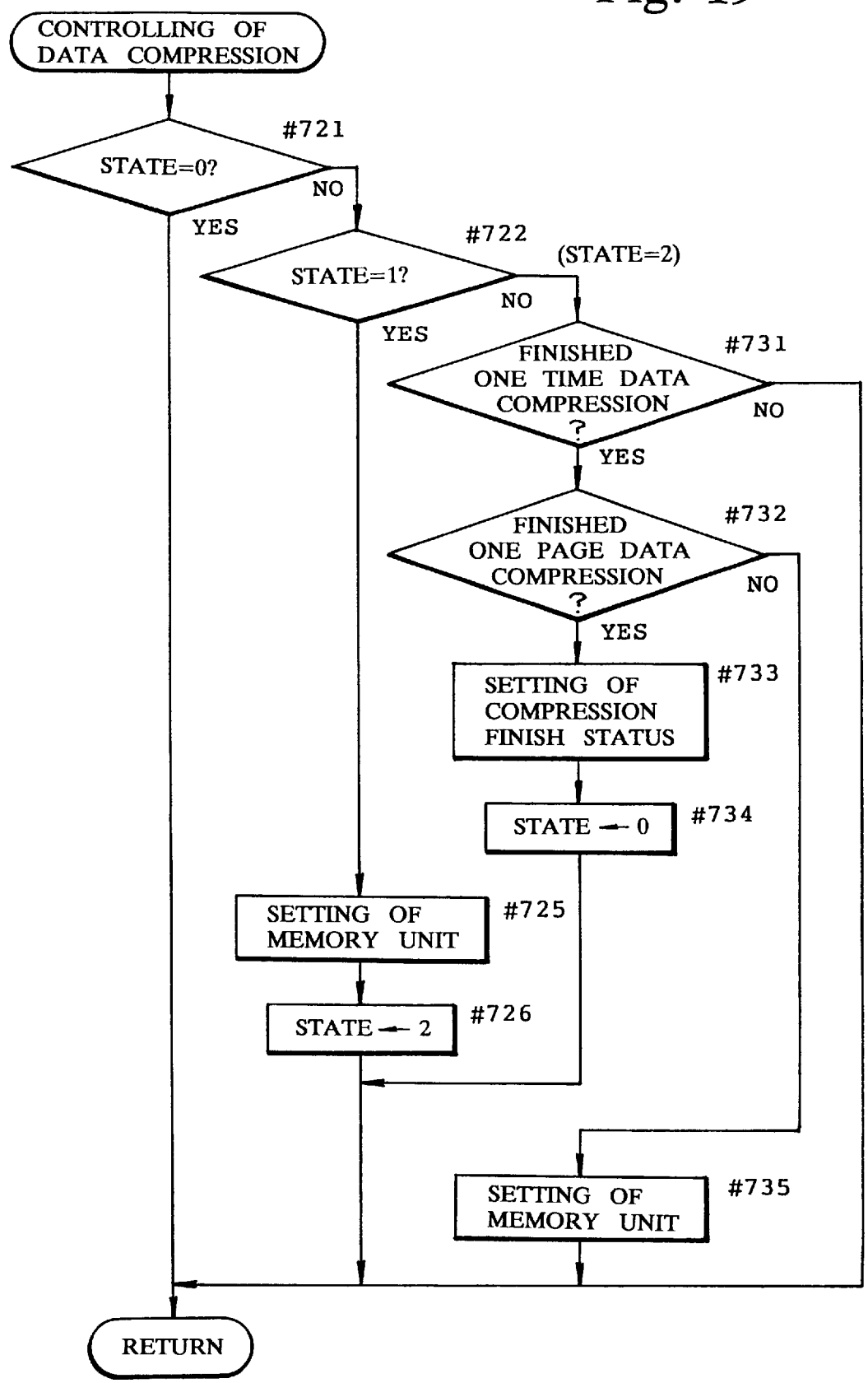
FIG. 19 is a flowchart showing details of data compression control.

FIG. 19 is a flowchart showing details of the compression control that is shown in the flowchart of FIG. 12 as step #75.

Firstly, the state numbers are determined (steps #721 and #722) and the operation moves to the corresponding state numbers.

When the state number is 0, the operation immediately returns to the main routine without performing any processing.

When the state number is 1, the setting processing of the memory unit, that is, the setting for compression processing such as setting the address of the image memory 304 for reading therefrom, XY length information, the address of the code memory 306 for writing thereto, the compression system and the like, is conducted and the content of the control table MT 1 is changed (step #725), the state number is set to 2 (step #726) and the operation returns to the main routine.

When the state number is 2, the setting processing of the memory unit at every compression processing of one memory region of the memory that is divided at every 32K byte. Firstly, the finishing of one compression processing is determined (step #731), when it is not finished, the operation returns to the main routine and continues the compression processing and when it is finished, the finishing of the compression processing for one page is determined (step #732).

When the compression processing of one page is finished, compression finish status is set (step #733), the state number is set to 0 (step #734) and the operation returns to the main routine. When the compression processing of one page is not finished, the memory unit is set (step #735) and the operation returns to the main routine.

Figure 20:
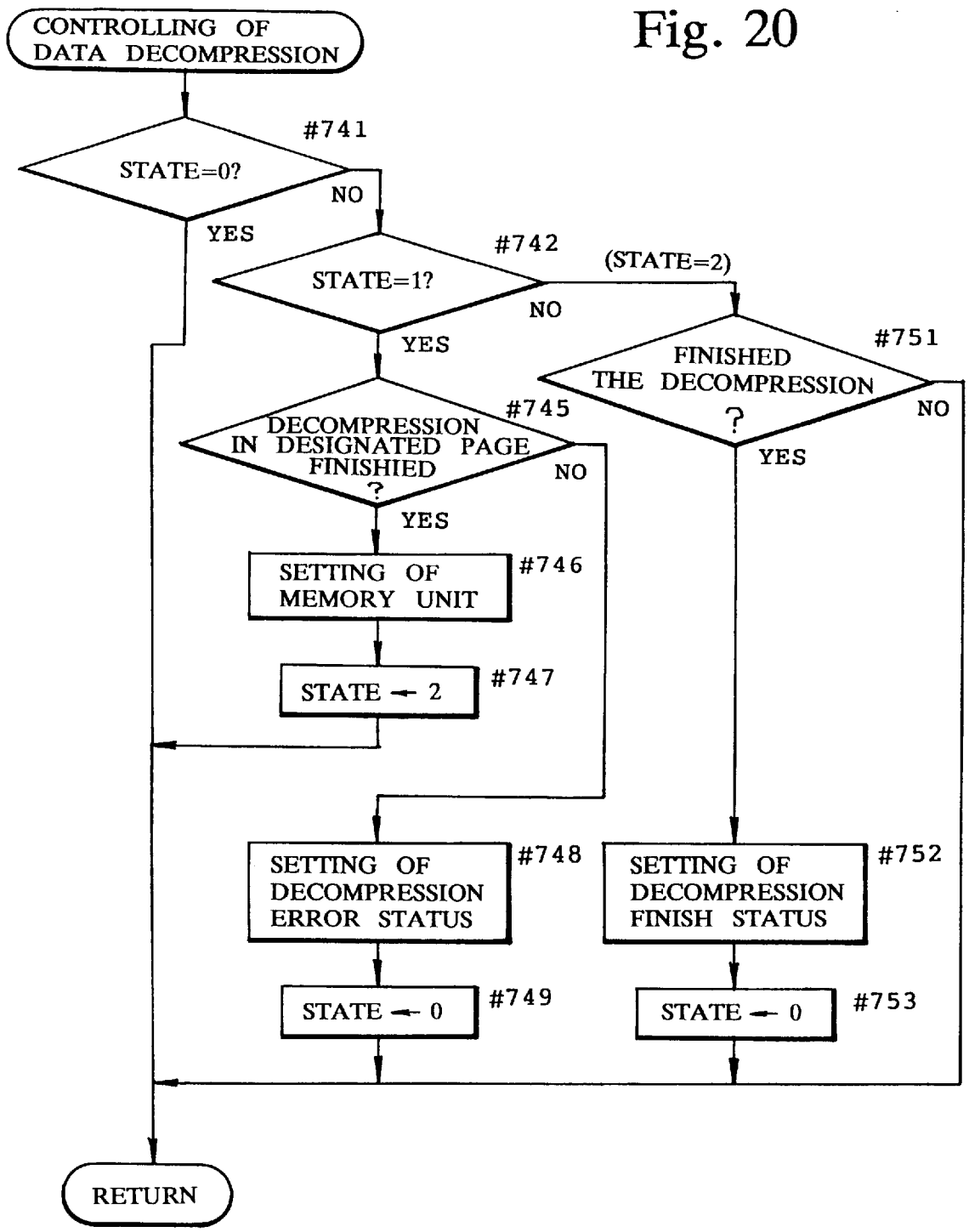
FIG. 20 is a flowchart showing details of data decompression control.

FIG. 20 is a flowchart showing details of the decompression control that is shown in the flowchart of FIG. 12 as step #76.

Firstly, the state numbers are determined (steps #741 and #742) and the operation moves to the corresponding state numbers.

When the state number is 0, the operation immediately returns to the main routine without conducting any processing.

When the state number is 1, whether designated pages have already been decompressed or not is determined (step #745), when they have been decompressed, the memory unit is set (step #746), the state number is set to 2 (step #747) and the operation returns to the main routine. When the designated pages have not been decompressed in the determination of step #745, decompression error status is set (step #748), the state number is set to 0 (step #749) and the operation returns to the main routine.

When the state number is 2, the finishing of the decompression processing of designated pages is determined (step #751), when it is finished, decompression finish status is set (step #752), the state number is set to 0 (step #753) and the operation returns to the main routine.

Figure 21:
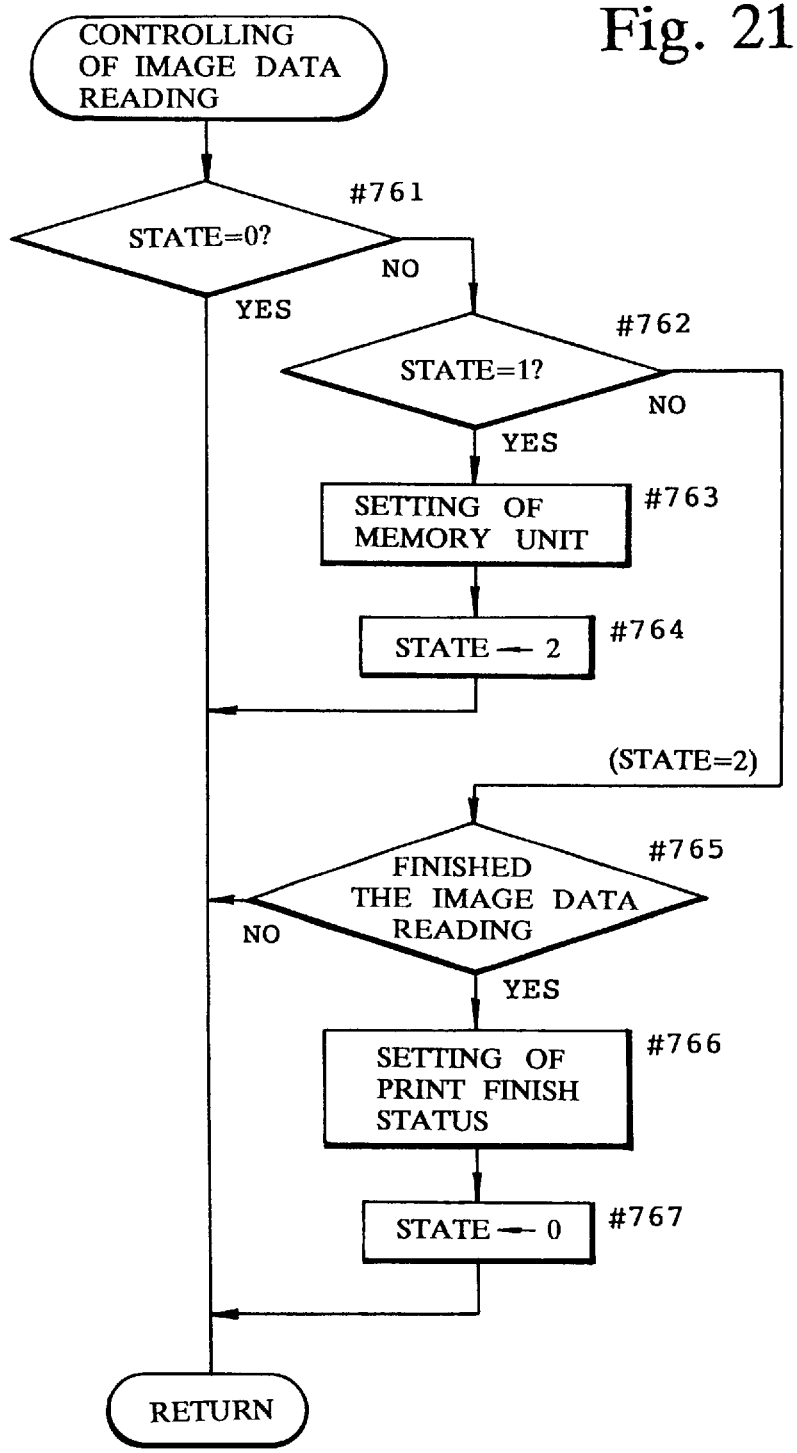
FIG. 21 is a flowchart showing details of image memory reading control.

FIG. 21 is a flowchart showing details of the controlling of image data reading from image memory that is shown in the flowchart of FIG. 12 as step #77.

Firstly, the state numbers are determined (steps #761 and #762) and the operation moves to the corresponding state numbers.

When the state number is 0, the operation immediately returns to the main routine without performing any processing.

When the state number is 1, the setting processing of the memory unit is conducted. That is, read start address for reading from the image memory 304, amount of data and other parameters are set (step #763), the state number is set to 2 (step #764) and the operation returns to the main routine.

When the state number is 2, finishing of reading image data from the image memory 304 is determined (step #765), when it is finished, print finish status is set (step #766), the state number is set to 0 (step #767) and the operation returns to the main routine.

In the above-described embodiments, a plurality of memory chips may be used or one memory chip which is divided into a plurality of memory regions may be used for the image memory 304 provided in the memory unit 30 so far as the writing operation and the reading operation are conducted simultaneously with and independently from each other.

Further, according to the above-described embodiments, although the binary data compression system is adopted in compressing image, the same operation can be performed in the case where a multi-valued data compression system is adopted. Also, with regards to the circuit structure of the control unit 100 starting from the memory unit 30, software structure such as processing content, allocation of processing and the like of respective CPUs 101 through 106, the structure of each portion of the image forming apparatus and the like, various modifications can be performed within a range not contrary to the gist of the present invention.

As described above, according to the present invention, in the recording processing where document image of plural pages is recorded on record paper, when the weekly magazine binding mode is designated as the bookbinding mode in reading image data from memory regions of the image data storing means storing the document image by the unit of page, the memory regions to be read are successively designated such that the record paper is outputted in compliance with the order of a predetermined page arrangement in accordance with the total page number of the document.

Thereby, the record paper outputted from the image forming apparatus is outputted in the page arrangement in accordance with the weekly magazine binding mode and therefore, print of the desired weekly magazine binding can simply be formed only by bookbinding the record paper without any special page editing operation and a time period from the finishing of the original document to the publishing of print can significantly be shortened.

Furthermore, according to the conventional weekly magazine binding mode, a plurality of sheets of record paper are folded in two in an overlapped state and therefore, when the number of sheets of the record paper to be bound is increased, the more the two-folded record paper is disposed at the inner side, the more outwardly it is pushed out in respect of the fold and the more the record paper is disposed at the inner side, the more outwardly the record paper is projected from the sheet of the record paper constituting the cover whereby the copy is provided with poor outlook. However, according to the weekly magazine binding mode of the present invention, record paper having a size twice as much as the designated size is used for the sheet of record paper constituting the cover, the record paper of the designated size is used for intermediate pages which are inserted inside of the sheet of record paper constituting the cover and therefore, even if the number of sheets of the record paper to be bound is increased, the record paper at the inner side is not projected significantly from the edge of the sheet of the record paper constituting the cover whereby a copy having good outlook can be formed.

According to the present invention, when the weekly magazine binding mode is selected, an optimum mode of either of the conventional weekly magazine binding mode and the weekly magazine binding mode of the present invention is automatically selected in accordance with the total page number of the document and therefore, a copy having good appearance can always be formed.

What is claimed is:

1. A digital image forming apparatus capable of forming images on both front faces and back faces of record paper sheets, said digital image forming apparatus comprising:

an image reading means for reading a document composed of a plurality of document pages and converting said document into image signals;

an image signal storing means having a plurality of image storing regions, each for storing the image signals corresponding to one of the document pages;

an image forming means for recording images on the record paper sheets based on the image signals stored in the image signal storing means;

a controlling means for successively designating the image storing regions, and for outputting the image signals to the image forming means such that the document pages are recorded on the record paper sheets in a predetermined order in accordance with a total number of document pages; and a bookbinding mode selecting means for selecting one of a first bookbinding mode, and a second bookbinding mode, a) in said first bookbinding mode, a first document page being recorded on a first face of a first record paper sheet having a size twice as large as a designated size, a second document page being recorded on a second face of the first record paper sheet, and, when the total number of a document pages is an even number, a final document page being recorded contiguously to the first document page on the first face of the first record paper sheet and a document page preceding the final document page being recorded contiguously to the second document page on the second face of the first record paper sheet, and when the total number of document pages is an odd number, the final document page being recorded contiguously to the second document page recorded on the second face of the first record paper sheet, unrecorded pages of a third document page and so forth being successively recorded on both faces of a plurality of second record paper sheets having the designated size, and said first record paper sheet being folded in two and said second record paper sheets being inserted and bound within the folded first record paper sheet, and b) in said second bookbinding mode, the document pages being successively recorded in accordance with a predetermined order on both faces of record papers sheets of the size twice as large as the designated size, and the record paper sheets being folded in two and bound at a folded edge, and the controlling means controlling the bookbinding mode selecting means to select the first bookbinding mode when the total number of document pages exceeds a predetermined number and to select the second bookbinding mode when the total number of document pages is equal to or less than the predetermined number.

2. A digital image forming apparatus capable of forming images on both front faces and back faces of record paper sheets, said digital image forming apparatus comprising:

an image reading means for reading a document composed of a plurality of document pages and converting said document into image signals;

an image signal storing means having a plurality of image storing regions, each for storing the image signals corresponding to one of the document pages;

an image forming means for recording images on the record papers sheets based on the image signals stored in the image signal storing means;

a bookbinding mode selecting means for selecting one of a first bookbinding mode and a second bookbinding mode, a) in said first bookbinding mode, a first document page being recorded on a first face of a first record paper sheet having a size twice as large as a designated size, a second document page being recorded on a second face of the first record paper sheet, and, when a total number of document pages is an even number a final document page being recorded contiguously to the first document page on the first face of the first record paper sheet, a document page preceding the final document page being recorded contiguously to the second document page on the second face of the first record paper sheet, and, when the total number of document pages is an odd number, the final document page being recorded contiguously to the second document page on the second face of the first record paper sheet, unrecorded pages of a third document page and so forth being successively recorded on both faces of a plurality of second record paper sheets having the designated size, and said first record paper sheet being folded in two and said second record paper sheets being inserted and bound within the folded first record paper sheet, and b) in said second bookbinding mode, the document pages being successively recorded in accordance with a predetermined order on both faces of record paper sheets having the size twice as large as the designated size, and the record paper sheets being folded in two and bound at a folded edge; and a controlling means for controlling the bookbinding mode selecting means to select the first bookbinding mode when the total number of document pages exceeds a predetermined number and to select the second bookbinding mode when the total number of document pages is equal to or less than the predetermined number, and for outputting the image signals to the image storing regions of the image signal storing means such that the record paper sheets on which the document page images are recorded are output in a predetermined page arrangement.

3. A digital image forming apparatus capable of forming images respectively on both front faces and back faces of record paper sheets, and said digital image forming apparatus comprising:

an image reading means for reading a document composed of a plurality of document pages and converting said document into image signals;

an image signal storing means having a plurality of image storing regions, each for storing the image signals corresponding to one of the document pages;

an image forming means for recording images on the record paper sheets based on the image signals stored in the image signal storing means;

a bookbinding mode selecting means for selecting one of a first bookbinding mode, and a second bookbinding mode, a) in said first bookbinding mode, a first document page being recorded on a first face of a first record paper sheet having a size twice as large as a designated size, a second document page being recorded on a second face of the first record paper sheet, unrecorded pages of a third document page and so forth being successively recorded on both faces of second record paper sheets having the designated size, and said first record paper sheet being folded in two with said second record paper sheets being inserted and bound within the folded first record paper sheet, and b) in said second bookbinding mode, the document pages being successively recorded in accordance with a predetermined order on both faces of record paper sheets having the size twice as large as the designated size, and the record paper sheets being folded in two and bound at a folded edge; and a controlling means for successively designating the image storing regions, and for outputting the image signals to the image forming means such that the document pages are recorded on the record paper sheets in a predetermined order in accordance with a total number of document pages, the controlling means controlling the bookbinding mode selecting means to select the first bookbinding mode when the total number of pages of the document exceeds a predetermined number of sheets and to select the second bookbinding mode when the total number of pages of the document is equal to or less than the predetermined number of sheets.

4. A digital image forming apparatus comprising:

an image signal receiving means for receiving image signals;

a memory for storing said image signals corresponding to a plurality of document pages;

an image forming means for recording images on record paper based on the image signals stored in the memory; and a controlling means for selecting one of a first bookbinding mode and a second bookbinding mode to record images, based on a total number of document pages, and controlling outputting of the signal images stored in the memory to the image forming means, in said first bookbinding mode, said images being recorded in accordance with a predetermined order at a plurality of positions on a first size record paper having a size twice as large as a designated size, and on a second size record paper of the designated size, said first size record paper being folded in two with said second size record paper being inserted and bound within the folded first size record paper, and in said second bookbinding mode, images being recorded on the first size record paper in accordance with a predetermined order a controlling means for selecting one of either the first bookbinding mode or the second bookbinding mode based on a total number of document pages; and an image forming means for recording an image on record paper based on the selected bookbinding mode.

5. The digital image forming apparatus according to claim 4, wherein said controlling means selects the first bookbinding mode when the total number of document pages exceeds a predetermined number, and selects the second bookbinding mode when the total number of document pages is less than or equal to the predetermined number.

* * * * *